United States Patent
Nakagawa

(10) Patent No.: US 9,354,905 B2
(45) Date of Patent: May 31, 2016

(54) MIGRATION OF PORT PROFILE ASSOCIATED WITH A TARGET VIRTUAL MACHINE TO BE MIGRATED IN BLADE SERVERS

(71) Applicant: FUJITSU LIMITED, Kawasaki-shi, Kanagawa (JP)

(72) Inventor: Yukihiro Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 316 days.

(21) Appl. No.: 13/934,294

(22) Filed: Jul. 3, 2013

(65) Prior Publication Data

US 2013/0298126 A1 Nov. 7, 2013

Related U.S. Application Data

(63) Continuation of application No. PCT/JP2011/050217, filed on Jan. 7, 2011.

(51) Int. Cl.
*G06F 9/455* (2006.01)
*H04L 12/931* (2013.01)
*G06F 9/48* (2006.01)

(52) U.S. Cl.
CPC ............ *G06F 9/455* (2013.01); *G06F 9/45558* (2013.01); *G06F 9/4856* (2013.01); *H04L 49/70* (2013.01); *G06F 2009/4557* (2013.01)

(58) Field of Classification Search
CPC .......... G06F 2009/4557; G06F 9/4856; H04L 49/70
See application file for complete search history.

(56) References Cited

U.S. PATENT DOCUMENTS 7,849,168 B2 * 12/2010 Utsunomiya ....... H04L 12/4645
709/220
8,417,800 B2 * 4/2013 Shah ................. G06F 17/30345
709/220

(Continued)

FOREIGN PATENT DOCUMENTS

JP 2010-124129 6/2010
JP 2010-176178 8/2010

(Continued)

OTHER PUBLICATIONS

R. Recio, S. Krishnasamy, and R. Sharma, "Ethernet Virtual Bridging Automation Use Cases," DV CAVES workshop ITC 22, Sep. 2010.*

(Continued)

*Primary Examiner* — Eric C Wai
*Assistant Examiner* — James J Lee
(74) *Attorney, Agent, or Firm* — Fujitsu Patent Center

(57) ABSTRACT

Each switch blade receives, from a CPU server serving as a migration destination to which a VM to be migrated is migrated, a setting request of port profile information corresponding to the VM. Then, each switch blade determines whether a VSI ID included in the received setting request is stored in a storage unit that stores therein the VSI ID identifying the VM. Subsequently, each switch blade executes processing according to the setting request when determining that the received VSI ID is stored in the storage unit. Furthermore, when determining that the received VSI ID is not stored in the storage unit, each switch blade forwards the setting request to an external switch that is an upper-level data relay device connected to the CPU server serving as the migration destination through the corresponding switch blade.

5 Claims, 16 Drawing Sheets

(56) References Cited

U.S. PATENT DOCUMENTS

| | | | |
|---|---|---|---|
| 8,489,763 B2* | 7/2013 | Armstrong | H04L 12/4625 709/238 |
| 8,819,235 B2* | 8/2014 | Cardona | G06F 9/45558 370/235 |
| 2005/0041596 A1* | 2/2005 | Yokomitsu | H04L 29/12283 370/252 |
| 2009/0172125 A1* | 7/2009 | Shekhar | G06F 11/2025 709/215 |
| 2009/0185571 A1* | 7/2009 | Tallet | H04L 12/4625 370/401 |
| 2009/0240790 A1* | 9/2009 | Utsunomiya | H04L 12/4645 709/221 |
| 2009/0292858 A1* | 11/2009 | Lambeth et al. | 711/6 |
| 2010/0082951 A1 | 4/2010 | Bates et al. | |
| 2010/0165877 A1* | 7/2010 | Shukla | H04L 41/0843 370/254 |
| 2010/0223397 A1* | 9/2010 | Elzur | H04L 41/0213 709/235 |
| 2010/0232443 A1* | 9/2010 | Pandey | 370/401 |
| 2011/0032944 A1* | 2/2011 | Elzur et al. | 370/395.53 |
| 2011/0035494 A1* | 2/2011 | Pandey | G06F 9/5077 709/224 |
| 2011/0085563 A1* | 4/2011 | Kotha et al. | 370/401 |
| 2011/0093849 A1* | 4/2011 | Chawla | H04L 41/0816 718/1 |
| 2011/0299413 A1* | 12/2011 | Chatwani | H04L 12/4625 370/252 |
| 2012/0016970 A1* | 1/2012 | Shah | G06F 9/45558 709/220 |
| 2012/0016973 A1* | 1/2012 | Haris | H04L 12/5696 709/220 |
| 2012/0102217 A1* | 4/2012 | Cardona | G06F 9/45558 709/235 |
| 2012/0185856 A1 | 7/2012 | Ashihara et al. | |

FOREIGN PATENT DOCUMENTS

| | | |
|---|---|---|
| JP | 2011-70549 A | 4/2011 |
| WO | WO-2007-083557 | 7/2007 |

OTHER PUBLICATIONS

V. Kashyap, A. Bergman, S. Berger, G. Stenzel, and J. Osterkamp, "Automating Virtual Machine Network Profiles," Linux Symposium, Jul. 2010, p. 147-152.*

Takayuki Saito, "Host OS Gata wa BB Router Hypervisor Gata wa L2 Switch", Nikkei Network, Jul. 2009, No. 111, pp. 27 to 31.

International Search Report, mailed in connection with PCT/JP2011/050217 and mailed Feb. 15, 2011.

Takayuki Saito, "Host OS Gata wa BB Router Hypervisor Gata wa L2 Switch", Nikkei Network, Jul. 2009, No. 111, pp. 27 to 31 (partial English Translation).

US Ofice Action dated Aug. 13, 2014 for co-pending U.S. Appl. No. 13/592,421, 7 pages.

* cited by examiner

FIG.4

| PORT PROFILE ID | VLAN | BANDWIDTH INFORMATION |
|---|---|---|
| 1 | VLAN100 | 100 MB |
| 2 | VLAN200 | 50 MB |
| ... | ... | ... |

FIG.5

| VSI ID | PORT PROFILE ID | VSI STATE | PORT NUMBER |
|---|---|---|---|
| VM 1 | 1 | FETCHED | P1 |
| VM 2 | 1 | FETCHED | P1 |
| VM 3 | 2 | ACTIVE | P2 |
| ... | ... | ... | ... |

FIG.6

| MAC ADDRESS | VLAN ID | PORT NUMBER |
|---|---|---|
| X | VLAN100 | P3 |
| Y | VLAN200 | P1 |
| ... | ... | ... |

MIGRATION OF PORT PROFILE ASSOCIATED WITH A TARGET VIRTUAL MACHINE TO BE MIGRATED IN BLADE SERVERS

CROSS-REFERENCE TO RELATED APPLICATION

This application is a continuation of International Application No. PCT/JP2011/050217, filed on Jan. 7, 2011, the entire contents of which are incorporated herein by reference.

FIELD

The embodiments discussed herein are related to a profile processing program, a data relay device, and a profile control method.

BACKGROUND

Heretofore, there has been known a server virtualization technology in which a virtual server called a VM (Virtual Machine) is operating on a server serving as an information processing apparatus. On the server, a VMM (Virtual Machine Monitor) performing various types of control relating to the VM, such as the creation of the VM, is operating. The VMM is called a hypervisor, for example, and manages hardware resources such as a memory and an IO (Input/Output) of the server.

As one of the functions relating to the server virtualization technology, there is a live migration that migrates a certain VM running on a server onto another server without stopping the operation of the VM. The live migration is used also in a cloud data center environment in which migration of the VM is executed freely.

When the VM is migrated by the live migration, a port profile corresponding to the VM to be migrated is also caused to be migrated in synchronization with the migration of the VM. The port profile includes information such as a VLAN (Virtual Local Area Network) and a QoS (Quality of Service). As a technique that automates the migration of the port profile, there is a protocol that is discussed in the IEEE (The Institute of Electrical and Electronics Engineers, Inc.) 802.1Qbg. This protocol is what is called a VSI (Virtual Station Interface) discovery protocol.

An AMMP (Automated Migration of Port Profile) using the VSI discovery protocol is described below. FIG. 17 is a sequence diagram illustrating automated processing of a port profile according to the related art. A system configuration illustrated in FIG. 17 includes a migration source server on which a VM to be migrated is running, a migration destination server that is the migration destination of the VM to be migrated, a switch that is connected to the migration source server and the migration destination server, and a port profile DB that retains the port profiles of the VMs.

As illustrated in FIG. 17, the migration destination server creates a new VM on the server itself when receiving an instruction operation from an administrator or the like (S1). Subsequently, when receiving a live migration instruction from a management terminal or the like (S2), the migration source server performs pre-copy, while the VM to be migrated is in the condition of operating on the source server (S3 and S4). Specifically, the VMM, which is operating on the migration source server, transfers the content of a memory used by itself into the VMM of the migration destination server. The VMM of the migration source server repeats the pre-copy in accordance with a change amount in memory.

When the pre-copy is started, the migration destination server transmits a PRE-ASSOC message of the VSI discovery protocol to a migration destination port of the switch (S5). The switch, which has received the message, acquires the port profile corresponding to the VM to be migrated from the port profile DB (S6). Then, the switch transmits a PRE-ASSOC CONF message to the migration destination server as a response to the PRE-ASSOC message (S7).

Thereafter, the migration source server performs stop-and-copy when the change amount in memory becomes equal to or smaller than a predetermined value (S8 and S9). Specifically, the VMM of the migration source server temporarily stops the operation of the VM to be migrated and transfers the content of the memory used by itself into the VMM of the migration target server. During the pre-copy operation, the VM to be migrated is running on the migration source server. The stop-and-copy is performed after the VM stops.

When the stop-and-copy is started, the migration destination server transmits an ASSOC message of the VSI discovery protocol to the migration destination port of the switch (S10). The switch, which has received the message, applies the port profile acquired when receiving the PRE-ASSOC message to the migration destination port (S11). Then, the switch transmits an ASSOC CONF message to the migration destination server as a response to the ASSOC message (S12). After this onwards, the VM to be migrated runs on the migration destination server.

The migration source server transmits a DE-ASSOC message of the VSI discovery protocol to a migration source port of the switch (S13). The switch, which has received the message, removes the port profile corresponding to the VM to be migrated from the migration source port (S14). Then, the switch transmits a DE-ASSOC CONF message to the migration source server as a response to the DE-ASSOC message (S15). In this way, the migration of the VM and the automated migration of the port profile are executed.

[Patent Document 1] Japanese Laid-open Patent Publication No. 2010-124129

[Patent Document 2] Japanese Laid-open Patent Publication No. 2010-176178

The related art, however, has a problem in that the port profiles are not automatically set to the switches configured in a multi-level structure.

An example is described in which the VSI discovery protocol is applied to a blade server in which a plurality of insertable and removable servers called blades are mounted in a chassis. FIG. 18 is a schematic diagram illustrating automated processing of a port profile in a blade server according to the related art.

As illustrated in FIG. 18, this system includes a blade server 1, a blade server 2, and an external switch 3 that connects the blade servers. A port profile DB server is connected to each blade server through the external switch. In each blade server, a switch blade that gathers a network of servers (CPU (Central Processing Unit) servers) is mounted. Each CPU server is connected to an external network or the other blade server through the switch blade. That is, the system illustrated in FIG. 18 has the multi-level structure of the switch blades and the external switch.

In such a system, S20 is described that indicates a case where a VM (A) operating on a CPU server 1a of the blade server 1 is migrated to a CPU server 1c of the blade server 1. In this case, PRE-ASSOC and ASSOC are exchanged between the CPU server 1c and the switch blade 1d, and DE-ASSOC is exchanged between the CPU server 1a and the switch blade 1d. As a result, the switch blade 1d can automatically acquire and set the port profile relating to the VM (A). In a case where the VM is migrated in the same blade server as in this case, the port profile in the external switch 3 does not need to be changed. The port profile of each switch thus can be automatically set.

Next, S21 is described that indicates a case where the VM (A) operating on the CPU server 1a of the blade server 1 is migrated to a CPU server 2a of the blade server 2. In this case, PRE-ASSOC and ASSOC are exchanged between the CPU server 2a and the switch blade 2c, and DE-ASSOC is exchanged between the CPU server 1a and the switch blade 1d. As a result, the switch blade 2c can automatically acquire and set the port profile relating to the VM (A). In a case where the VM is migrated between the blade servers as in this case, the port profile in the external switch 3 needs to be changed. The VSI discovery protocol is, however, a protocol defined between the blade server and the switch blade. That is, a server edge is present between the CPU server in the blade server and the switch blade. As a result, the port profile in the external switch is not automatically set even if the VSI discovery protocol is used.

Generally, the switch blade 1d notifies a network management system or the like of the migration of the VM and the network management system executes the setting of the port profile of the external switch 3. This technique, however, requires the network management system to have a port profile setting function newly established, which is expensive and therefore not practical.

SUMMARY

According to an aspect of an embodiment, a computer-readable recording medium stores a profile processing program causing a computer to execute a process including receiving, from a migration destination server to which a virtual machine to be migrated is migrated, a setting request of port profile information corresponding to the virtual machine; determining whether, in a storage unit storing therein a virtual machine identifier identifying the virtual machine, the virtual machine identifier included in the received setting request is stored; executing a setting process of the port profile information according to the setting request when it is determined that the received virtual machine identifier is stored in the storage unit; and forwarding the setting request to a data relay device connected to the migration destination server through the computer when it is determined that the received virtual machine identifier is not stored in the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic diagram illustrating an example of information stored in a port profile table;

FIG. 5 is a schematic diagram illustrating an example of information stored in a VSI table;

FIG. 6 is a schematic diagram illustrating an example of information stored in a MAC table;

DESCRIPTION OF EMBODIMENTS

Preferred embodiments of the present invention will be explained with reference to accompanying drawings.

The embodiments do not limit the present invention.

[First Embodiment]

Overall Configuration

Figure 1:
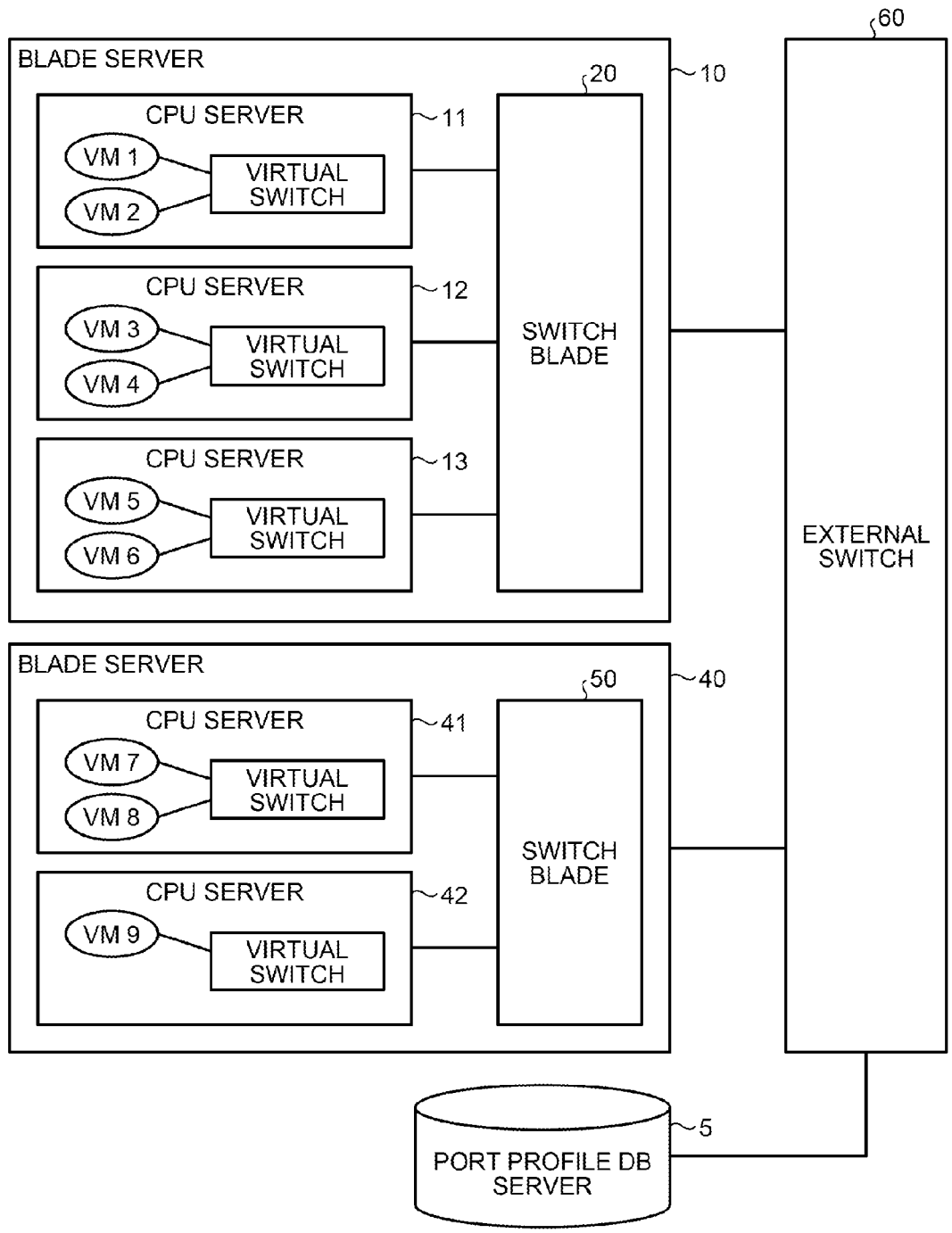
FIG. 1 is a schematic diagram illustrating an overall configuration of a system according to a first embodiment.

FIG. 1 is a schematic diagram illustrating an overall configuration of a system according to a first embodiment. As illustrated in FIG. 1, this system includes a blade server 10, a blade server 40, an external switch 60, and a port profile DB (database) server 5. The numbers of servers and the like illustrated herein are not limited to these.

The port profile DB server 5 stores therein operation environments of VMs (Virtual Machines) running on the respective blade servers in association with the respective VMs. For example, the port profile DB server 5 stores therein information such as a VLAN (Virtual Local Area Network), a QoS (Quality of Service), and an allocated bandwidth corresponding to the VM.

The blade server 10 and the blade server 40 are servers that include a plurality of insertable and removable servers called blades mounted in a chassis. For example, the blade server 10 includes CPU (Central Processing Unit) servers 11 to 13 and a switch blade 20, while the blade server 40 includes CPU servers 41 and 42, and a switch blade 50, as illustrated in FIG. 1. The numbers of servers included in the blade servers 10 and 40 illustrated in FIG. 1 and the like are not limited to these. For example, other boards such as an IO (Input/Output) board may be included.

The CPU servers included in the respective blade servers, which are the insertable and removable servers described above, execute VMMs (Virtual Machine Monitors) called hypervisors so as to cause the VMs to operate. For example, each CPU server causes the VM and a virtual switch to operate by the VMM so as to execute exchange of data between itself and the other CPU servers and the other VMs. In FIG. 1, VMs 1 and 2 are operating on the CPU server 11, VMs 3 and 4 are operating on the CPU server 12, and VMs 5 and 6 are operating on the CPU server 13, in the blade server 10, as an example. In the blade server 40, VMs 7 and 8 are operating on the CPU server 41 while a VM 9 is operating on the CPU server 42.

The switch blade included in each blade server controls communication in a blade server and communication between the blade servers using a transfer scheme such as Ethernet (registered trademark) or Fiber channel. For example, the switch blade 20 relays data exchanged between the VM 1 of the CPU server 11 and the VM 5 of the CPU server 13 and controls the communication in the blade server. The switch blades 20 and 50 relay data exchanged between the VM 3 of the CPU server 12 and the VM 7 of the CPU server 41 through the external switch 60 and control the communication between the blade servers.

The external switch 60, which is connected to the switch blades in the respective blade servers, is a data relay device, such as a layer 2 switch, controlling the communication between the blade servers. For example, the external switch 60 has the same functions as the switch blades 20 and 50, and relays data exchanged between the switch blades 20 and 50.

As described above, the CPU servers are connected to an external network and the other blade server through the respective switch blades. That is, the system illustrated in FIG. 1 has a multi-level structure of the switch blades and the external switch.

In the system configuration, each switch blade receives, from the CPU server serving as the migration destination to which the VM to be migrated is migrated, a setting request of port profile information corresponding to the VM. Each switch blade determines whether a VSI (Virtual Station Interface) ID included in the received setting request is stored in a storage unit that stores therein VSI IDs identifying VMs. Subsequently, each switch blade executes processing according to the setting request when determining that the received VSI ID is stored in the storage unit. When determining that the received VSI ID is not stored in the storage unit, each switch blade forwards the setting request to the external switch 60, which is an upper-level data relay device connected to the CPU server serving as the migration destination through the corresponding switch blade.

Each switch blade receives, from the CPU server serving as a migration source on which the VM is running, a deletion request of the port profile information corresponding to the VM. Subsequently, each switch blade determines whether the VSI ID included in the received deletion request is stored in the storage unit that stores therein the VSI IDs identifying the VMs. When determining that the received VSI ID is stored in the storage unit, each switch blade deletes a port profile stored in the storage unit in association with the VSI ID. On the other hand, when determining that the received VSI ID is not stored in the storage unit, each switch blade forwards the deletion request to the external switch 60, which is the upper-level data relay device connected to the migration source CPU server through the corresponding switch blade or destroys the deletion request.

In this way, each switch blade executes setting processing or deletion processing of the profile therein when determining that the live migration of the VM is the migration in a blade server. When determining that the migration of the VM is the migration between the blade servers, each switch blade forwards the setting request or the deletion request to the external switch 60. The external switch 60, which has received such requests, executes the setting processing or the deletion processing in the same manner as each switch blade.

That is, various messages relating to the VSI discovery protocol, which are exchanged between the CPU servers and the switch blades, for example, are extended to the external switch 60. Because of this, in the VM migration between the blade servers, an end point of each of the blade servers, i.e., a point between the blade server and the external switch, can be set as the server edge.

As a result, in the migration in a blade server, the port profiles can be automatically set to the respective switch blades because various messages relating to the VSI discovery protocol are exchanged between the respective switch blades and the CPU servers. In the migration between the blade servers, the port profiles can be automatically set to the external switch 60 because various messages relating to the VSI discovery protocol are exchanged between the CPU servers and the external switch 60. Consequently, even if the switches are provided in the multi-level structure, the port profiles can be automatically set to the switches.

Configuration of Each Device

Next, configurations of the respective devices illustrated in FIG. 1 are described. As the respective CPU servers have the same functions, the description is made on the CPU server 11. As the switch blades 20 and 50, and the external switch 60 have the same functions, the description is made on the switch blade 20.

Configuration of CPU Server

Figure 2:
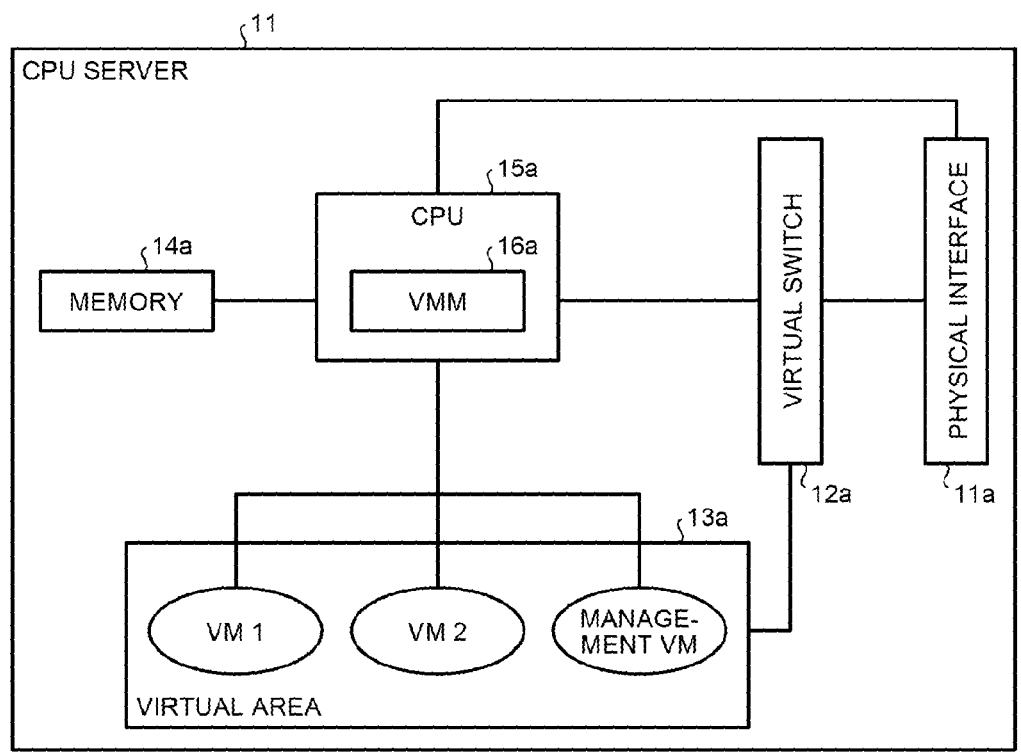
FIG. 2 is a block diagram illustrating a configuration of a CPU server according to the first embodiment.

FIG. 2 is a block diagram illustrating a configuration of the CPU server according to the first embodiment. As illustrated in FIG. 2, the CPU server 11 includes a physical interface 11a, a virtual switch 12a, a virtual area 13a, a memory 14a, and a CPU 15a. The configuration and the like of the CPU server illustrated herein are an example and they are not limited to these. For example, an SC (system controller) and a MAC (memory access controller) may be included.

The physical interface 11a, which has at least one port, is a network interface card (NIC) that controls the communication with the other server and the VMs. For example, the physical interface 11a transmits the PRE-ASSOC message, the ASSOC message, and the DE-ASSOC message of the VSI discovery protocol to the switch blade 20. The physical interface 11a receives the PRE-ASSOC CONF message, the ASSOC CONF message, and the DE-ASSOC CONF message of the VSI discovery protocol through the switch blade 20.

The virtual switch 12a is a switch virtually created by a VMM 16a, which will be described later, and controls the communication between the VMs and the communication of the VM with an outside. For example, when the VM 1 operating on the CPU server 11 transmits data to the VM 3 operating on the CPU server 12, the virtual switch 12a receives the data and outputs the received data to the physical interface 11a. When the VM 3 operating on the CPU server 12 transmits data to the VM 1 operating on the CPU server 11, the virtual switch 12a receives the data through the physical interface 11a and outputs the received data to the VM 1. As a result, the VM 1 and the VM 3 can communicate with each other.

The virtual area 13a is an area in which the VM created by the VMM 16a, which will be described later, operates, and any number of VMs can be initiated. For example, in the virtual area 13a, the VMs 1 and 2 serving as the virtual servers and a management VM serving as a management domain that manages the virtual servers such as the VMs 1 and 2 are initiated. Each VM executes processing by using a virtual memory and a virtual processor. For example, the virtual memory is a virtual memory provided by allocating a predetermined area in the memory 14a as a memory that the VM uses. The virtual processor is a virtual processor provided by allocating a predetermined processing capability in the CPU 15a as a processor that the VM uses.

The memory 14a is a storage device, such as a semiconductor memory, storing therein data and computer programs which is used for various types of processing executed by the CPU 15a, which will be described later, and is used for allocating the virtual memory and the like, for example.

The CPU 15a includes an internal memory that stores therein control programs such as an OS (Operating System), computer programs defining various processing procedures, and necessary data, and also includes the VMM 16a, and executes various types of processing.

The VMM 16a is software that executes various types of control relating to the VM such as creation, deletion, initiation, and stopping of the VM, and executes the live migration, for example. For example, when receiving a VM creation instruction from an administrator terminal or the like, the VMM 16a creates the VM in the virtual area 13a, and when receiving a VM deletion instruction from the administrator terminal or the like, the VMM 16a deletes the VM from the virtual area 13a. When receiving a VM initiating instruction from the administrator terminal or the like, the VMM 16a initiates the VM on the virtual area 13a, and when receiving a VM stop instruction from the administrator terminal or the like, the VMM 16a stops the VM on the virtual area 13a.

When receiving pre-copy from any of the other CPU servers, the VMM 16a executes the pre-copy in coordination with the corresponding CPU server. The VMM 16a transmits the PRE-ASSOC message of the VSI discovery protocol to the switch blade 20 through the physical interface 11a. Thereafter, the VMM 16a receives the PRE-ASSOC CONF message of the VSI discovery protocol through the physical interface 11a.

When receiving stop-and-copy from any of the other CPU servers, the VMM 16a executes the stop-and-copy in coordination with the corresponding CPU server. The VMM 16a transmits the ASSOC message of the VSI discovery protocol to the switch blade 20 through the physical interface 11a. Thereafter, the VMM 16a receives the ASSOC CONF message of the VSI discovery protocol through the physical interface 11a.

When receiving the deletion instruction of the VM from the administrator terminal or the like, the VMM 16a transmits the DE-ASSOC message of the VSI discovery protocol to the switch blade 20 through the physical interface 11a. Thereafter, the VMM 16a receives the DE-ASSOC CONF message of the VSI discovery protocol through the physical interface 11a.

Configuration of Switch Blade

Figure 3:
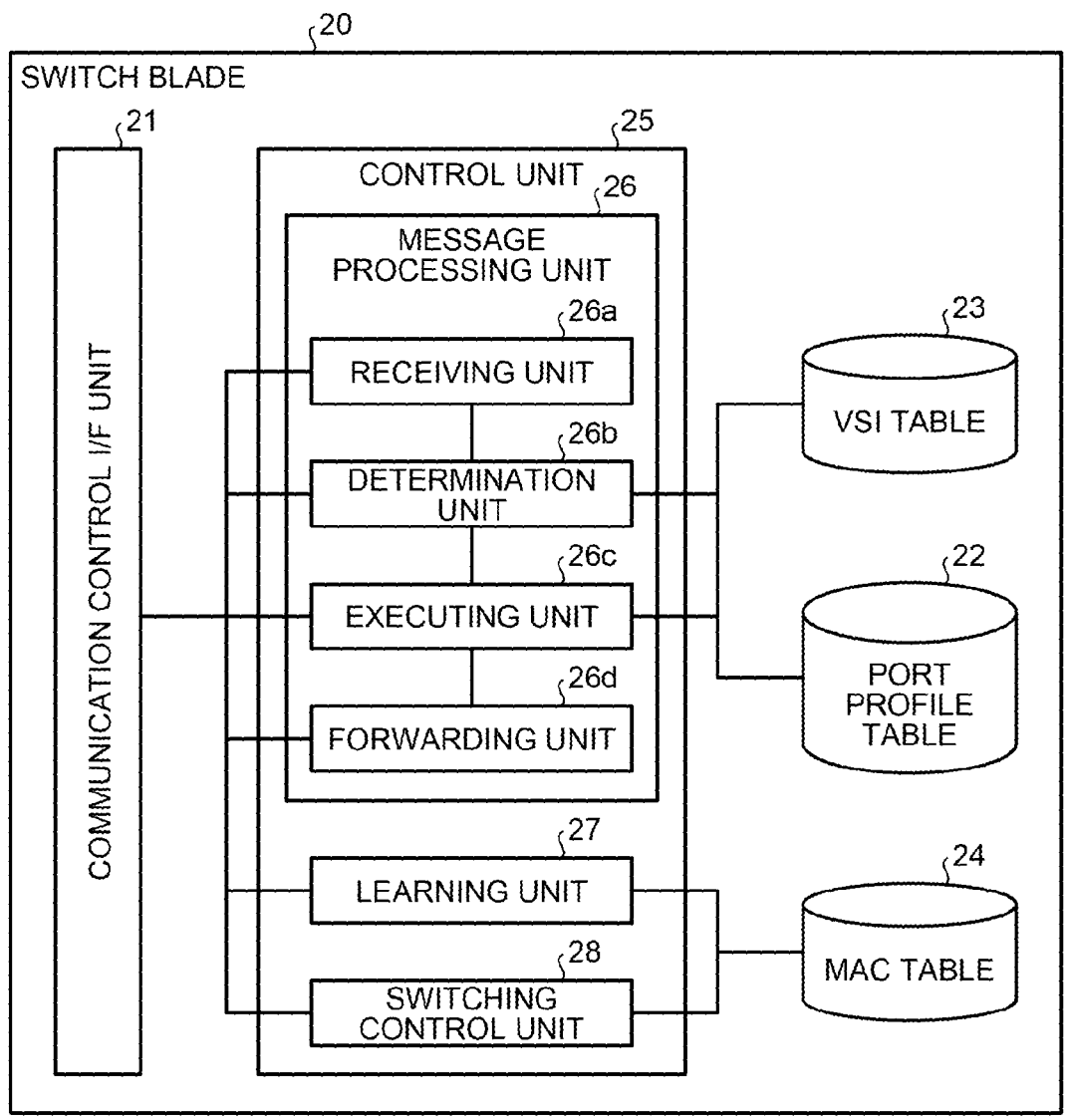
FIG. 3 is a block diagram illustrating a configuration of a switch blade according to the first embodiment.

FIG. 3 is a block diagram illustrating a configuration of the switch blade according to the first embodiment. As illustrated in FIG. 3, the switch blade 20 includes a communication control I/F unit 21, a port profile table 22, a VSI table 23, a MAC (Media Access Control) table 24, and a control unit 25. Each table is a storage device such as a semiconductor memory element or a hard disc drive.

The communication control I/F unit 21, which has at least one port, is a NIC that controls the communication with the other server and the external switch 60. For example, the communication control I/F unit 21 receives the PRE-ASSOC message, the ASSOC message, or the DE-ASSOC message from the CPU server 11 or the other CPU servers, and outputs the received message to the control unit 25. The communication control I/F unit 21 transmits the PRE-ASSOC CONF message, the ASSOC CONF message, or the DE-ASSOC CONF message output from the control unit 25 to the CPU server serving as the request origin. The communication control I/F unit 21 forwards the PRE-ASSOC CONF message, the ASSOC CONF message, or the DE-ASSOC CONF message transmitted from the external switch 60 to the CPU server serving as the request origin.

The port profile table 22 is a storage unit that caches information acquired from the port profile DB server 5 connected through the external switch 60. The information stored in the port profile table 22 is stored or deleted by an executing unit 26c, which will be described later. FIG. 4 is a schematic diagram illustrating an example of the information stored in the port profile table. As illustrated in FIG. 4, the port profile table 22 stores therein "a port profile ID, a VLAN, and bandwidth information" as "1,VLAN100,100 MB" or "2,VLAN200,50 MB", for example. The information stored in the port profile table 22 is not limited to the information illustrated in FIG. 4, and can be added or deleted in any desired manner.

The "port profile ID" stored therein is an identifier that identifies the port profile. The "VLAN" stored therein indicates a VLAN to which the port to which the profile is set belongs. The "bandwidth information" indicates the bandwidth allocated to the port. The example of FIG. 4 indicates that the port profile of the port profile ID=1 sets a bandwidth of 100 MB using the VLAN of a VLAN100 to the port. That is, the VM using this port communicates using the VLAN of the VLAN100 in a bandwidth of 100 MB.

Likewise, the port profile of the port profile ID=2 indicates that it sets a bandwidth of 50 MB using the VLAN of a VLAN200 to the port. That is, the VM using this port communicates using the VLAN of the VLAN200 in a bandwidth of 50 MB.

The VSI table 23 stores therein allocation information of the port profile. The information stored in the VSI table 23 is stored or deleted by the executing unit 26c, which will be described later. FIG. 5 is a schematic diagram illustrating an example of the information stored in the VSI table. As illustrated in FIG. 5, the VSI table 23 stores therein "a VSI ID, a port profile ID, a VSI State, and a port number" in association with each other. The information stored in the VSI table 23 is not limited to the information illustrated in FIG. 5, and can be added or deleted in any desired manner.

The "VSI ID" stored therein is an identifier that identifies the VM. The "port profile ID" is an identifier that identifies the port profile to be applied. The "VSI State" indicates a state of the port profile. The "port number" indicates the port number to which the port profile is allocated, i.e., the port number that the VM uses.

In the example of FIG. 5, the port that the VM 1 uses is P1 and the port profile of the port profile ID=1 corresponding to the VM 1 is already acquired from the port profile DB server 5. Likewise, the port that the VM 2 uses is P1 and the port profile of the port profile ID=1 corresponding to the VM 2 is already acquired from the port profile DB server 5. The port that the VM 3 uses is P2, and the port profile of the port profile ID=2 corresponding to the VM 3 is already allocated to P2.

The MAC table 24 stores therein the MAC address of the CPU server dynamically learned by a learning unit 27, which will be described later, the VLAN, and the port number. The information stored in the MAC table 24 is stored or deleted by the learning unit 27, which will be described later. FIG. 6 is a schematic diagram illustrating an example of the information stored in the MAC table. As illustrated in FIG. 6, the MAC table 24 stores therein "the MAC address, a VLAN ID, and the port number" as "X,VLAN100,P3" or "Y,VLAN200,P1", for example. The information stored in the MAC table 24 is not limited to the information illustrated in FIG. 6, and can be added or deleted in any desired manner.

The "MAC address" stored therein is the MAC address of a transmission origin, which is included in data (packet) received through the communication control I/F unit 21 and the learned MAC address. The "VLAN ID" is an identifier that identifies the VLAN and is included in the packet received through the communication control I/F unit 21. The "port number" is the port number of the communication control I/F unit 21 that has received the packet, and makes it possible to recognize to which port number the server is connected.

In the example of FIG. 6, the server having address X is connected to P3 to which the VLAN100 is allocated. That is, data whose transmission destination is address X is transmitted from the port number P3 to which the VLAN100 is allocated. Likewise, the server having address Y is connected to P1 to which the VLAN200 is allocated. That is, data whose transmission destination is address Y is transmitted from the port number P1 to which the VLAN200 is allocated.

Referring back to FIG. 3, the control unit 25 is an electronic circuit such as a CPU or an MPU (Micro Processing Unit). The control unit 25 includes an internal memory that stores therein computer programs defining various processing procedures and necessary data, and also includes a message processing unit 26, the leaning unit 27, and a switching control unit 28, and executes various types of processing with them.

The message processing unit 26 includes a receiving unit 26a, a determination unit 26b, the executing unit 26c, and a forwarding unit 26d, and executes various types of processing in accordance with the messages that have been received from the CPU server and are compliant with the VSI discovery protocol.

The receiving unit 26a receives, from the CPU server serving as the migration destination to which the VM to be migrated is migrated, the setting request of the port profile information corresponding to the VM. The receiving unit 26a receives, from the CPU server serving as the migration source on which the VM is running, the deletion request of the port profile information corresponding to the VM.

For example, when receiving the PRE-ASSOC message from the CPU server serving as the migration destination of the VM, the receiving unit 26a outputs the message to the determination unit 26b. Likewise, when receiving the DE-ASSOC message from the CPU server serving as the migration source of the VM, the receiving unit 26a outputs the message to the determination unit 26b. When receiving the ASSOC message from the CPU server serving as the migration destination of the VM, the receiving unit 26a outputs the message to the determination unit 26b.

When receiving the PRE-ASSOC CONF message from the external switch 60, the receiving unit 26a outputs the message to the forwarding unit 26d. Likewise, when receiving the ASSOC CONF message or the DE-ASSOC CONF message from the external switch 60, the receiving unit 26a outputs the message to the forwarding unit 26d.

Figure 7:
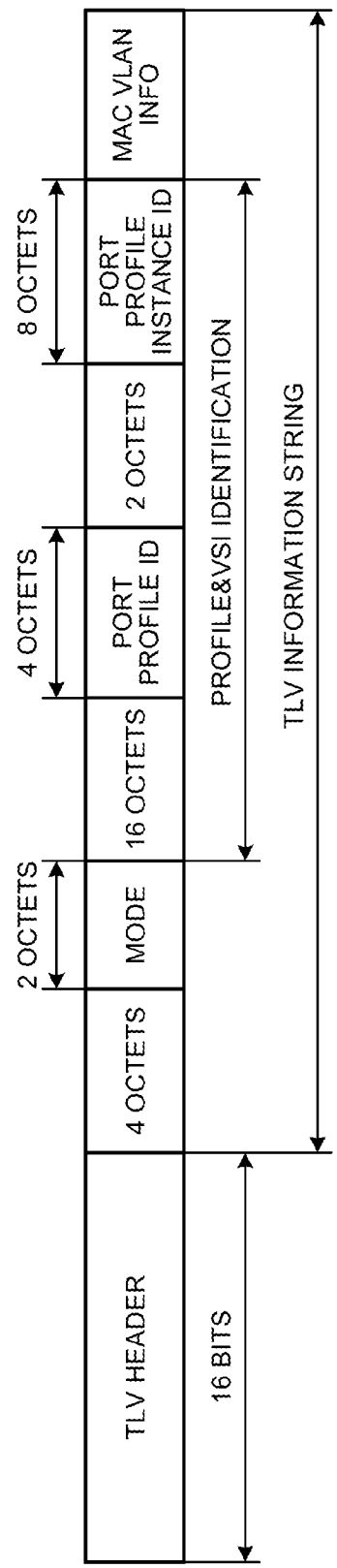
FIG. 7 is a schematic diagram illustrating an example of a message used in a VSI discovery protocol.

As an example, the receiving unit 26a receives a message defined in a TLV (Type Length Value) format illustrated in FIG. 7. FIG. 7 is a schematic diagram illustrating an example of the message used in the VSI discovery protocol. In the message format illustrated in FIG. 7, a TLV Information String that is detailed information of the message is added to a TLV header of 16 bits. The receiving unit 26a determines the type of message on the basis of whether "Mode" defined by two octets in the TLV Information String is the "PRE-ASSOC", "ASSOC", or "DE-ASSOC".

In the message illustrated in FIG. 7, the "VSI ID" is stored in "Port Profile Instance ID" defined by eight octets in the TLV Information String. In the message illustrated in FIG. 7, the "port profile ID" is stored in "Port Profile ID" defined by four octets in the TLV Information String.

The determination unit 26b determines whether the VSI ID included in the setting request received by the receiving unit 26a is stored in the VSI table 23 storing therein VSI IDs identifying VMs. The determination unit 26b determines whether the VSI ID included in the deletion request received by the receiving unit 26a is stored in the VSI table 23 storing therein the VSI IDs identifying the VMs.

For example, when a message having "Mode" illustrated in FIG. 7 in which the "PRE-ASSOC", "ASSOC", or "DE-ASSOC" is described is received, the determination unit 26b acquires the VSI ID stored in "Port Profile Instance ID" of the message. Subsequently, the determination unit 26b determines whether the VSI ID acquired from the message is stored in the VSI table 23. When the VSI ID is stored in the VSI table 23, the determination unit 26b determines that the migration of the VM is the migration within the same blade server (chassis), and outputs the message to the executing unit 26c. On the other hand, when the VSI ID is not stored in the VSI table 23, the determination unit 26b determines that the migration of the VM is the migration between blade servers (chassis), and outputs the message to the forwarding unit 26d.

When determining that the VSI ID included in the PRE-ASSOC message is stored, the determination unit 26b stores the VSI ID and the determination result in a memory or the like in association with each other. In this state, when receiving the ASSOC or the DE-ASSOC message that includes the VSI ID the determination result of which is retained in the memory or the like, the determination unit 26b can also output the message to the executing unit 26c without executing the determination of whether the VSI ID is stored. That is, the determination unit 26b determines that the VM is operating on the same blade server as the VM to be deleted because the ASSOC or the DE-ASSOC message is received in the state where it is determined that the migration is within the same blade server, and outputs the message to the executing unit 26c.

Likewise, when receiving the ASSOC or the DE-ASSOC message in the state where it is determined that the VSI ID included in the PRE-ASSOC message is not stored, the determination unit 26b can also output the message to the external switch 60 without executing the determination on the VSI ID.

When it is determined that the VSI ID included in the received message is stored in the VSI table 23, the executing unit 26c executes the processing according to the setting request. For example, when it is determined that the VSI ID included in the PRE-ASSOC message is stored, the executing unit 26c acquires the port profile corresponding to the VSI ID from the port profile DB server 5, and stores the acquired port profile in the port profile table 22. In addition, the executing unit 26c stores the ID of the acquired port profile, the port number at which the message has been received, and the VSI ID included in the message in the VSI table 23 in association with each other, and sets "VSI State" to "FETCHED". Then, the executing unit 26c transmits the PRE-ASSOC CONF message indicating that the port profile has been stored to the transmission origin server of the PRE-ASSOC message as a response to the PRE-ASSOC message.

Thereafter, when receiving the ASSOC message from the receiving unit 26a, the executing unit 26c identifies the port profile corresponding to the VSI ID from the VSI table 23.

Subsequently, the executing unit 26c changes "VSI State" of the identified port profile to "ACTIVE" from "FETCHED". Then, the executing unit 26c transmits the ASSOC CONF message indicating that the setting change of the port profile is completed to the transmission origin server of the ASSOC message as a response to the ASSOC message.

When the determination unit 26b determines that the VSI ID included in the DE-ASSOC message is stored, the executing unit 26c extracts the VSI ID included in the message. Then, the executing unit 26c identifies the port profile corresponding to the extracted VSI ID from the VSI table 23, and deletes the identified port profile. Then, the executing unit 26c transmits the DE-ASSOC CONF message indicating that the deletion of the port profile is completed to the transmission origin server of the DE-ASSOC message as a response to the DE-ASSOC message.

The forwarding unit 26d forwards the message received by the receiving unit 26a to the external switch 60 when the determination unit 26b determines that the migration of the VM is the migration between the chassis. The forwarding unit 26d forwards the response message received by the receiving unit 26a from the external switch 60.

For example, when receiving the PRE-ASSOC message, the ASSOC message, or the DE-ASSOC message by which the determination unit 26b has determined the migration as the migration between the chassis, the forwarding unit 26d forwards the message to the external switch 60.

When the receiving unit 26a receives the PRE-ASSOC CONF message, the forwarding unit 26d forwards the PRE-ASSOC CONF message to the CPU server having transmitted the PRE-ASSOC message. Likewise, when the receiving unit 26a receives the ASSOC CONF message, the forwarding unit 26d forwards the ASSOC CONF message to the CPU server having transmitted the ASSOC message. When the receiving unit 26a receives the DE-ASSOC CONF message, the forwarding unit 26d forwards the DE-ASSOC CONF message to the CPU server having transmitted the DE-ASSOC message.

The receiving unit 26a stores in a memory or the like a request message such as the PRE-ASSOC message and the transmission origin acquired from the request message in association with each other. This allows the executing unit 26c and the forwarding unit 26d to identify the transmission origin of the response message, i.e., the transmission destination of the request message, for example. For example, when receiving the PRE-ASSOC CONF message as the response message, the forwarding unit 26d can identify the transmission origin corresponding to the PRE-ASSOC message from the memory or the like, and transmit the PRE-ASSOC CONF message to the identified transmission origin. Thereafter, the forwarding unit 26d may delete the transmission origin corresponding to the PRE-ASSOC message from the memory or the like.

The receiving unit 26a stores in the memory or the like the request message such as the PRE-ASSOC message, the transmission origin, and furthermore the VSI ID acquired from the request message in association with each other. As a result, even if a plurality of migrations of the VMs occur simultaneously, the VSI ID makes it possible to identify the migration of which VM, thereby enabling the response message to be transmitted to the transmission origin.

Referring back to FIG. 3, the learning unit 27 learns the MAC addresses of the CPU server and the like. For example, when data is received by the communication of VLAN ID=VLAN300 through port number P5 from the CPU server having MAC address address Z, the learning unit 27 stores "address Z,VLAN300,P5" in the MAC table 24.

The switching control unit 28 executes switching control of data received by the communication control I/F unit 21. For example, the switching control unit 28 determines whether the MAC address of the destination of the received data is stored in the MAC table 24. When the MAC address is stored in the MAC table 24, the switching control unit 28 transmits the received data from the port having the port number corresponding to the MAC address. On the other hand, when the MAC address is not stored in the MAC table 24, the switching control unit 28 executes flooding that transmits the data from all of the ports.

Procedure of Processing

The procedure of processing executed by the system according to the first embodiment is described below. A sequence when the VM is migrated between the chassis, the procedure of processing at the switch when receiving a request message, and the procedure of request message processing are described herein.

Sequence when the VM is Migrated Between the Chassis

Figure 8:
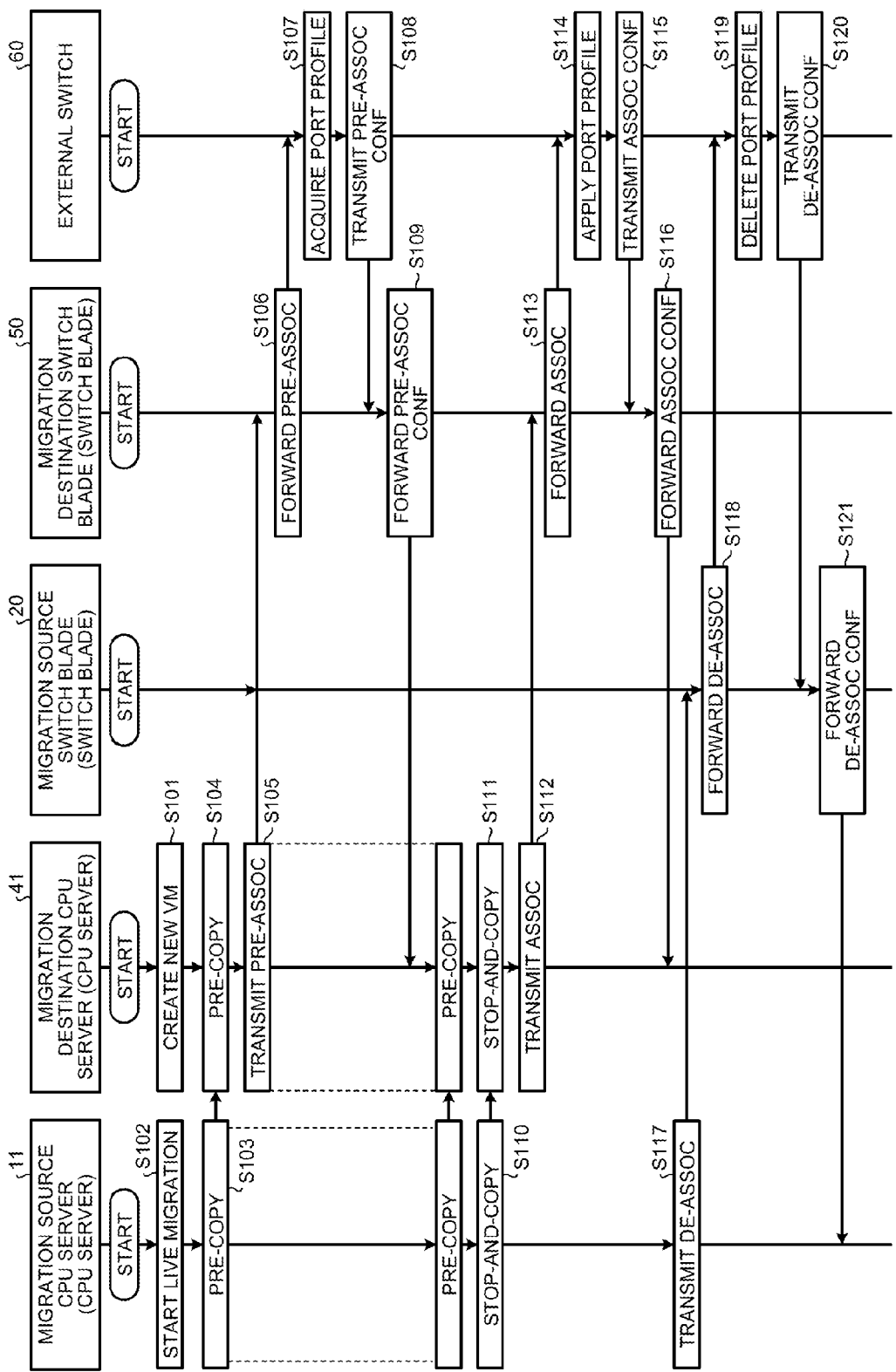
FIG. 8 is a sequence diagram when a VM is migrated between blade servers.

FIG. 8 is a sequence diagram when the VM is migrated between the blade servers. The description is made on the basis of an example when the VM is migrated from the CPU server 11 to the CPU server 41 illustrated in FIG. 1. That is, the CPU server 11 is the migration source server while the CPU server 41 is the migration destination server. The switch blade 20 included in the same blade server as the CPU server 11 is a migration source switch blade while the switch blade 50 included in the same blade server as the CPU server 41 is a migration destination switch blade.

Under such a condition, as illustrated in FIG. 8, the VMM of the CPU server 41 creates a new VM on the server itself when receiving the instruction operation from an administrator or the like (S101). Subsequently, when receiving the live migration instruction from a management terminal or the like (S102), the VMM of the CPU server 11 executes the pre-copy in the condition that the VM to be migrated is operating on the CPU server 11 (S103 and S104).

When the pre-copy is started, the VMM of the CPU server 41 transmits the PRE-ASSOC message of the VSI discovery protocol to the switch blade 50 (S105). The determination unit of the switch blade 50 determines that the migration is a VM migration between the blade servers on the basis of the VSI ID included in the PRE-ASSOC message received by the receiving unit, and the forwarding unit forwards the received PRE-ASSOC message to the external switch 60 (S106).

The executing unit of the external switch 60 to which the message has been forwarded acquires the port profile corresponding to the VSI ID included in the PRE-ASSOC message from the port profile DB server 5, and stores the acquired port profile in the port profile table (S107). Then, the executing unit of the external switch 60 transmits the PRE-ASSOC CONF message to the switch blade 50 as a response to the PRE-ASSOC message (S108). Subsequently, the forwarding unit of the switch blade 50 forwards the PRE-ASSOC CONF message received from the external switch 60 to the CPU server 41 serving as the transmission origin of the PRE-ASSOC message (S109).

Thereafter, the VMM of the CPU server 41 executes the stop-and-copy when the change amount in memory becomes equal to or smaller than a predetermined value (S110 and S111).

When the stop-and-copy is started, the VMM of the CPU server 41 transmits the ASSOC message of the VSI discovery protocol to the switch blade 50 (S112). The determination unit of the switch blade 50 determines that the migration is a VM migration between the blade servers on the basis of the VSI ID included in the ASSOC message received by the receiving unit, and the forwarding unit forwards the received ASSOC message to the external switch (S113). The forwarding unit can also forward the message without executing the determination of whether the VSI ID included in the ASSOC message is stored when it is determined that the VSI ID included in the PRE-ASSOC message is not stored.

The executing unit of the external switch 60 to which the message has been forwarded updates the VSI table 23 corresponding to the VSI ID included in the ASSOC message and applies the port profile (S114). Then, the executing unit of the external switch 60 transmits the ASSOC CONF message to the switch blade 50 as the response to the ASSOC message (S115). Subsequently, the forwarding unit of the switch blade 50 forwards the ASSOC CONF message received from the external switch 60 to the CPU server 41 serving as the transmission origin of the ASSOC message (S116).

On the other hand, the VMM of the CPU server 11 transmits the DE-ASSOC message of the VSI discovery protocol to the switch blade 20 (S117). The determination unit of the switch blade 20 determines that the migration is a VM migration between the blade servers on the basis of the VSI ID included in the DE-ASSOC message received by the receiving unit, and the forwarding unit forwards the received DE-ASSOC message to the external switch 60 (S118).

The executing unit of the external switch 60 to which the message has been forwarded identifies the port profile corresponding to the VSI ID included in the DE-ASSOC message from the VSI table 23, and deletes the identified port profile (S119). Then, the executing unit of the external switch 60 transmits the DE-ASSOC CONF message to the switch blade 20 as a response to the DE-ASSOC message (S120).

Subsequently, the forwarding unit of the switch blade 20 forwards the DE-ASSOC CONF message received from the external switch 60 to the CPU server 11 serving as the transmission origin of the DE-ASSOC message (S121).

Procedure of Processing when a Request Message is Received

Figure 9:
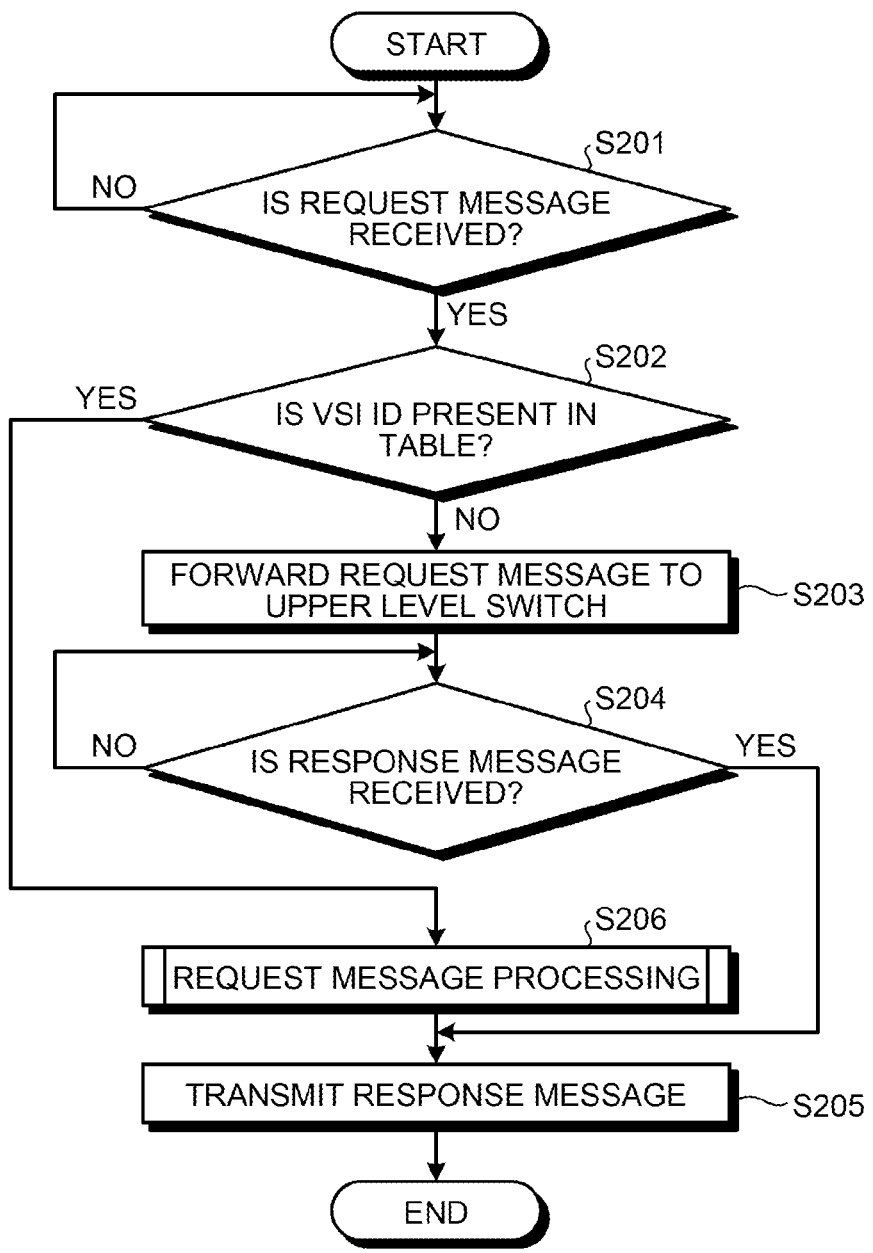
FIG. 9 is a flowchart illustrating the procedure of processing when a request message is received.

FIG. 9 is a flowchart illustrating the procedure of processing when a request message is received. The processing illustrated in FIG. 9 is executed by each of the switch blade 20, the switch blade 50, and the external switch 60 illustrated in FIG. 8. Thus, the description is made on the switch blade 20 exemplarily illustrated in FIG. 3 as an example.

As illustrated in FIG. 9, if the receiving unit 26*a* of the switch blade 20 receives a request message from the CPU server (Yes at S201), the determination unit 26*b* determines whether the VSI ID included in the message is stored in the VSI table 23 (S202).

For example, when the PRE-ASSOC message or the ASSOC message is received, the determination unit 26*b* extracts the "VSI ID" stored in "Port Profile Instance ID" in the message. Then, the determination unit 26*b* determines whether the "VSI ID" extracted from the message is stored in the VSI table 23 in an active state. When the DE-ASSOC message is received, the determination unit 26*b* determines whether the "VSI ID" is stored only in that port in the VSI table 23.

If the determination unit 26*b* determines that the VSI ID included in the ASSOC message is not stored in an active state in the VSI table 23 (No at S202), the forwarding unit 26*d* forwards the message to the upper level switch (S203). For example, in the system illustrated in FIG. 1, the forwarding unit 26*d* forwards the message to the external switch 60. If the determination unit 26*b* determines that the VSI ID included in the DE-ASSOC message is stored only in that port in the VSI table, the forwarding unit 26*d* forwards the message to the upper level switch (S203).

Thereafter, if the receiving unit 26*a* receives a response message transmitted from the upper level switch (Yes at S204), the forwarding unit 26*d* forwards the response message to the CPU server serving as the request origin (S205). For example, when the receiving unit 26*a* receives the PRE-ASSOC message from the external switch 60, the forwarding unit 26*d* transmits the PRE-ASSOC CONF message to the CPU server that has transmitted the PRE-ASSOC message.

On the other hand, if the determination unit 26*b* determines that the VSI ID included in the ASSOC message is stored in an active state in the VSI table 23 (Yes at S202) or the VSI ID included in the DE-ASSOC message is also stored in ports other than the port in the VSI table, the executing unit 26*c* executes request message processing corresponding to the received request message (S206). Thereafter, the executing unit 26*c* transmits a response message according to the processed request message to the CPU server that has transmitted the request message. For example, when executing processing corresponding to the ASSOC message, the executing unit 26*c* transmits the ASSOC CONF message to the CPU server that has transmitted the ASSOC message.

Procedure of Request Message Processing

Figure 10:
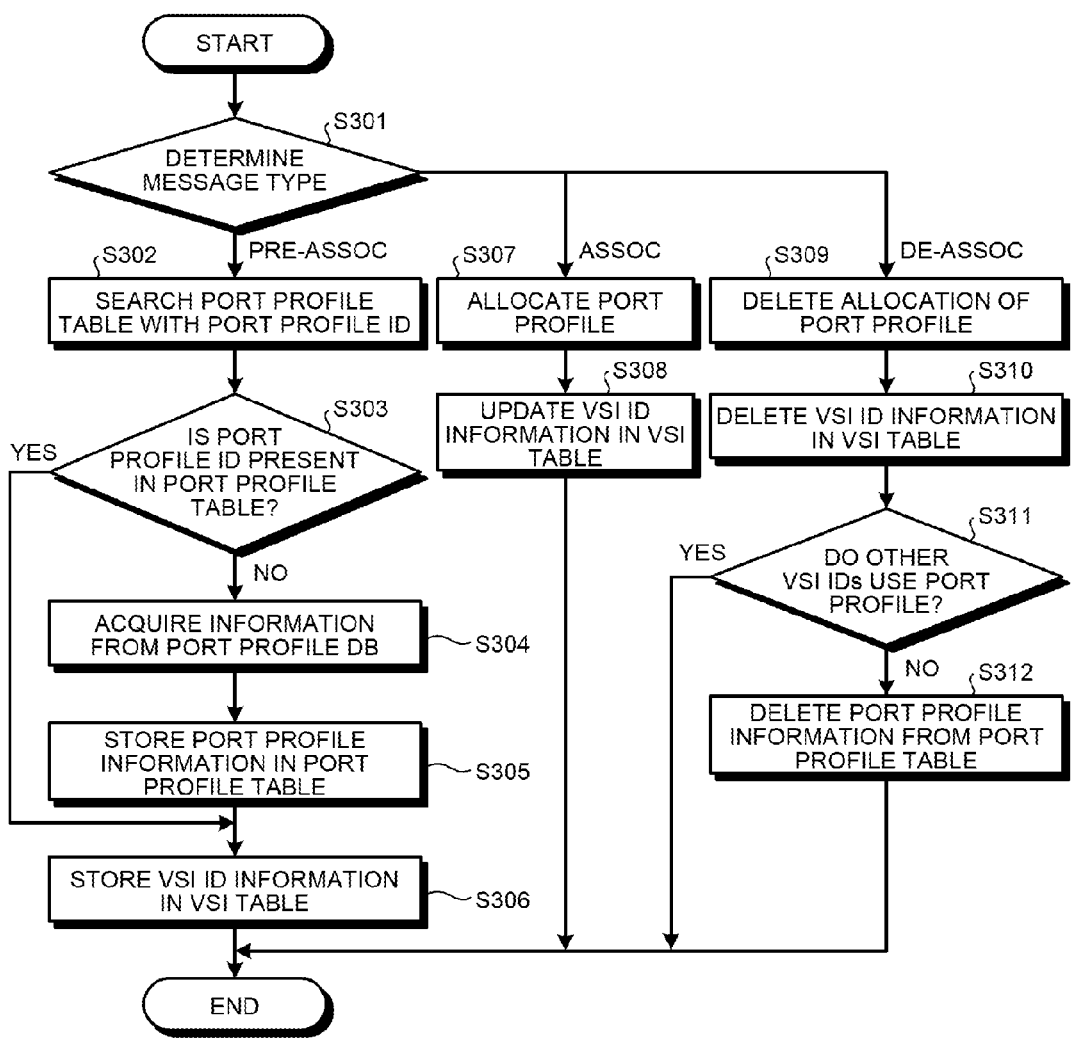
FIG. 10 is a flowchart illustrating the procedure of request message processing.

FIG. 10 is a flowchart illustrating request message processing. The processing illustrated in FIG. 10 is the processing executed at S206 illustrated in FIG. 9. This processing is executed by each of the switch blade 20, the switch blade 50, and the external switch 60 illustrated in FIG. 8. Thus, the description is made on the switch blade 20 exemplarily illustrated in FIG. 3 as an example.

As illustrated in FIG. 10, the executing unit 26*c* of the switch blade 20 determines the message type by the request message by which the determination unit 26*b* has determined the migration as a migration within the same blade server (S301). For example, the executing unit 26*c* identifies the message type by "Mode" in the received request message.

Then, if the executing unit 26*c* determines that the message type is "PRE-ASSOC", the executing unit 26*c* searches the port profile table 22 with the "port profile ID" described in "Port Profile ID" of the request message (S302).

Subsequently, if the "port profile ID" is not present in the port profile table 22 (No at S303), the executing unit 26*c* acquires a port profile corresponding to the port profile ID from the port profile DB server 5 (S304). Then, the executing unit 26*c* stores the acquired port profile in the port profile table 22 (S305).

Thereafter, the executing unit 26*c* stores the ID and the VSI information of the acquired port profile in the VSI table 23 (S306). At this time, the executing unit 26*c* stores the "VSI State" of the VSI information as "FETCHED". The executing unit 26*c* stores the "port number" of the port having received the request message and the "VSI ID" described in "Port Profile Instance ID" of the request message as the VSI information.

On the other hand, if the "port profile ID" is present in the port profile table 22 (Yes at S303), the executing unit 26*c* executes S306 without executing S304 and S305.

If the executing unit 26*c* determines that the message type is "ASSOC" at S301, the executing unit 26*c* executes the allocation of the port profile (S307). For example, the executing unit 26*c* sets the VLAN and the bandwidth to the port. Then, the executing unit 26*c* searches the VSI table 23 with the "VSI ID" described in "Port Profile Instance ID" of the request message, and updates the "VSI State" corresponding to the "VSI ID" to "ACTIVATE" (S308).

If the executing unit 26*c* determines that the message type is "DE-ASSOC" at S301, the executing unit 26*c* deletes the allocation of the port profile (S309). For example, the executing unit 26c deletes the setting of the VLAN and the bandwidth set to the port. Then, the executing unit 26c searches the VSI table 23 with the "VSI ID" described in "Port Profile Instance ID" of the request message, and deletes information associated with the "VSI ID" (S310).

Subsequently, the executing unit 26c acquires the "port profile ID" from the message, and determines whether other VSI IDs use this "port profile ID" (S311). If the executing unit 26c determines that other VSI IDs do not use the "port profile ID" (No at S311), the executing unit 26c deletes information stored in the port profile table 22 associated with the "port profile ID" (S312). On the other hand, if the executing unit 26c determines that other VSI IDs use the "port profile ID" (Yes at S311), the executing unit 26c ends the processing.

For example, the executing unit 26c searches the VSI table 23, and determines whether other VSI IDs use the "port profile ID" on the basis of whether the VSI ID to which the "port profile ID" is allocated is present.

Advantageous Effects of the First Embodiment

According to the first embodiment, the VSI discovery protocol is extended and the end point of the blade server is caused to be recognized as the server edge. The switch blade can notify the external switch of the VM migration while operating as an adjacent switch. Specifically, when the switch blade receives a message of the VSI discovery protocol from the CPU server, the switch blade determines whether the migration is that in the switch blade serving as its adjacent switch. If the migration is that in the adjacent switch, the adjacent switch itself performs processing as is conventionally done. On the other hand, if the migration is not that in the adjacent switch, the switch blade forwards the message to the upper level switch, waits for the response from the upper level switch, and then transmits the response message to the CPU server.

As a result, an edge virtual bridge can be extended to the switches configured in a multi-level structure. This makes it possible to automatically set the port profile in accordance with the VM migration even if the VM is migrated between the chassis of blade servers.

It is also conceivable that the switch blade is caused not to operate as a relay but to operate as an extended port of the external switch (port extender, IEEE802.1Qbh). However, it is preferable to cause the switch blade to operate as the adjacent switch in terms of bandwidths, taking into consideration a port number ratio of the switch blade. In addition, this makes it possible to shorten a delay time (latency) of packet relay.

[b] Second Embodiment

In the first embodiment, the technique is described that extends the VSI discovery protocol. In a second embodiment, the VSI discovery protocol can be extended to the external switch by adjusting the operation of the virtual switch as a result of the extension of an edge virtual bridge (EVB) discovery protocol. Specifically, by exchanging the EVB discovery protocol (IEEE 802.1Qbg) between the blade server and the external switch, the external switch can operate as an adjacent switch.

In the second embodiment, the extension of the EVB discovery protocol is described. An overall configuration of a system, a configuration of a switch, and the procedure of processing are described herein.

Overall Configuration

Figure 11:
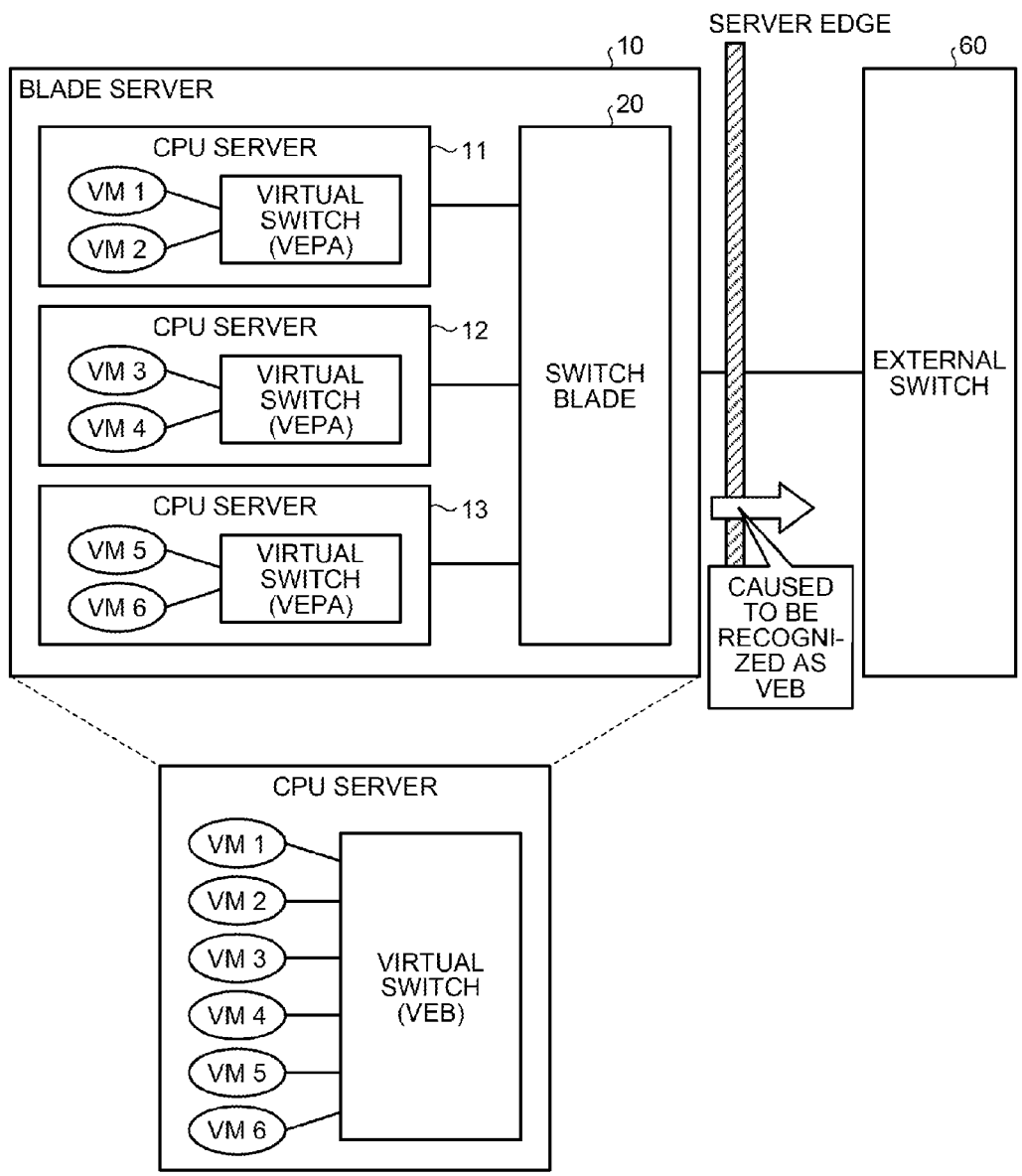
FIG. 11 is a schematic diagram illustrating an overall configuration of a system according to a second embodiment.

FIG. 11 is a schematic diagram illustrating an overall configuration of a system according to the second embodiment. As illustrated in FIG. 11, this system includes the blade server 10 and the external switch 60. The number of servers and the like illustrated herein are not limited to these. As the internal configuration of the blade server 10, the external switch, and the like are the same as those of FIG. 1, detailed description thereof is omitted.

Each CPU server in the blade server is operating in an operation mode (VEPA: Virtual Ethernet (registered trademark) Port Aggregation) for controlling even the communication between the VMs in the server itself through the switch blade 20, which is an external data relay device. The external switch 60 is operating in an operation mode (VEB: Virtual Ethernet (registered trademark) Bridge) for controlling the communication between VMs in the server within the server. That is, the CPU server is operating as a VEPA while the external switch is operating as a VEB.

Under such a condition, the switch blade 20 notifies the external switch 60 that the whole of the blade server 10 operates as the VEB. That is, the switch blade 20 causes the whole of the blade server 10 to be recognized as the VEB by the external switch 60, whereas each CPU server is operating as the VEPA. That is, when the CPU server is the VEB, a return from the switch blade 20 is caused to be off, and when the CPU server is the VEPA, a return from the external switch is caused to be on.

As a result, when each CPU server is operating as the VEPA and the external switch 60 is also operating as the VEPA, the switch blade 20 notifies the external switch 60 of the operation mode notified from the CPU server without any change. When each CPU server is operating as the VEB and the external switch 60 is also operating as the VEB, the switch blade 20 notifies the external switch 60 of the operation mode notified from the CPU server without any change. When each CPU server is operating as the VEPA and the external switch 60 is operating as the VEB, the switch blade 20 converts the operation mode (VEPA) notified from the CPU server into VEB and notifies the external switch 60 of the converted mode.

Configuration of Each Device

Next, configurations of the respective devices illustrated in FIG. 11 are described. As each server has the same configuration as the CPU server 11 described with reference to FIG. 2, the detailed description thereof is omitted. The switch blade 20 and the external switch 60 also have the same functions, the description is made on the switch blade 20.

Configuration of Switch Blade

Figure 12:
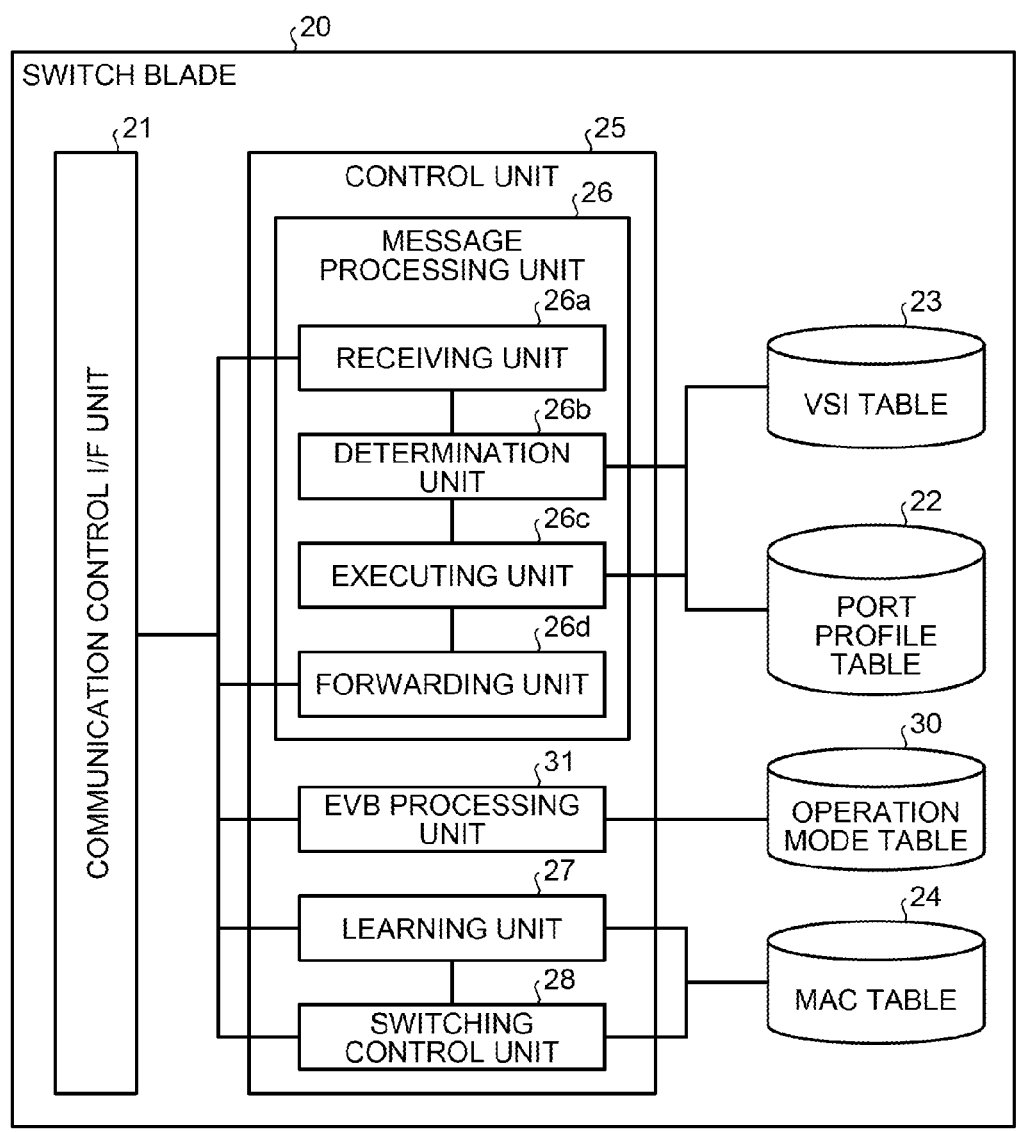
FIG. 12 is a block diagram illustrating a configuration of a switch blade according to the second embodiment.

FIG. 12 is a block diagram illustrating a configuration of the switch blade according to the second embodiment. As illustrated in FIG. 12, the switch blade 20 includes the communication control I/F unit 21, the port profile table 22, the VSI table 23, the MAC table 24, an operation mode table 30, and the control unit 25. Each table is a storage device such as a semiconductor memory element or a hard disc drive.

The communication control I/F unit 21, the port profile table 22, the VSI table 23, and the MAC table 24 have the same functions as the functions described with reference to FIG. 3, and the detailed descriptions thereof are omitted. The message processing unit 26, the learning unit 27, and the switching control unit 28 included in the control unit 25 have the same functions as the functions described with reference to FIG. 3, and the detailed descriptions thereof are also omitted.

In the second embodiment, the operation mode table 30 and an EVB processing unit 31 of the control unit 25 are described, which have different functions from those of the first embodiment.

The operation mode table 30 stores therein the operation modes and the like of the CPU servers and the external switch 60. Information stored therein is stored in the EVB processing unit 31, which will be described later, or otherwise stored by an administrator or the like. For example, the operation mode table 30 stores therein the operation mode "VEPA" of the CPU server 11 and the operation mode "VEPA" of the external switch 60.

The EVB processing unit 31 executes processing according to the messages compliant with the EVB discovery protocol. For example, the EVB processing unit 31 receives an EDCP (Edge Discovery and Configuration Protocol) message of the EVB discovery protocol from each CPU server through the communication control I/F unit 21. The EVB processing unit 31 acquires the operation mode from the received EDCP message and stores the acquired operation mode in the operation mode table 30. For example, when the acquired operation mode is "VEPA", the EVB processing unit 31 executes a return setting and executes a relay of data received from the VM or the like of the CPU server.

The EVB processing unit 31 notifies the external switch 60 of the operation mode with predetermined intervals. For example, the EVB processing unit 31 refers to the operation mode table 30, and, when the operation mode of the CPU server is "VEPA" and the operation mode of the external switch 60 is "VEB", notifies the external switch 60 that the operation mode of the whole of the blade server is "VEB".

The EVB processing unit 31 refers to the operation mode table 30, and, when the operation mode of the CPU server is "VEPA" and the operation mode of the external switch 60 is "VEPA", notifies the external switch 60 that the operation mode of the whole of the blade server is "VEPA". The EVB processing unit 31 refers to the operation mode table 30, and, when the operation mode of the CPU server is "VEB" and the operation mode of the external switch 60 is "VEB", notifies the external switch 60 that the operation mode of the whole of the blade server is "VEB".

As a timing of the notification of operation mode, the operation mode can be transmitted periodically, such as once every hour or every day. The notification can be made immediately after the acquisition of the operation mode from the EDCP message.

Procedure of Processing

Next, the procedure of processing executed by the switch blade 20 when receiving the EDCP message, and the procedure of EDCP message extension processing executed by the switch blade 20 are described. The processing can be executed by the external switch in the same manner as the switch blade.

Procedure of Processing when the EDCP Message is Received

Figure 13:
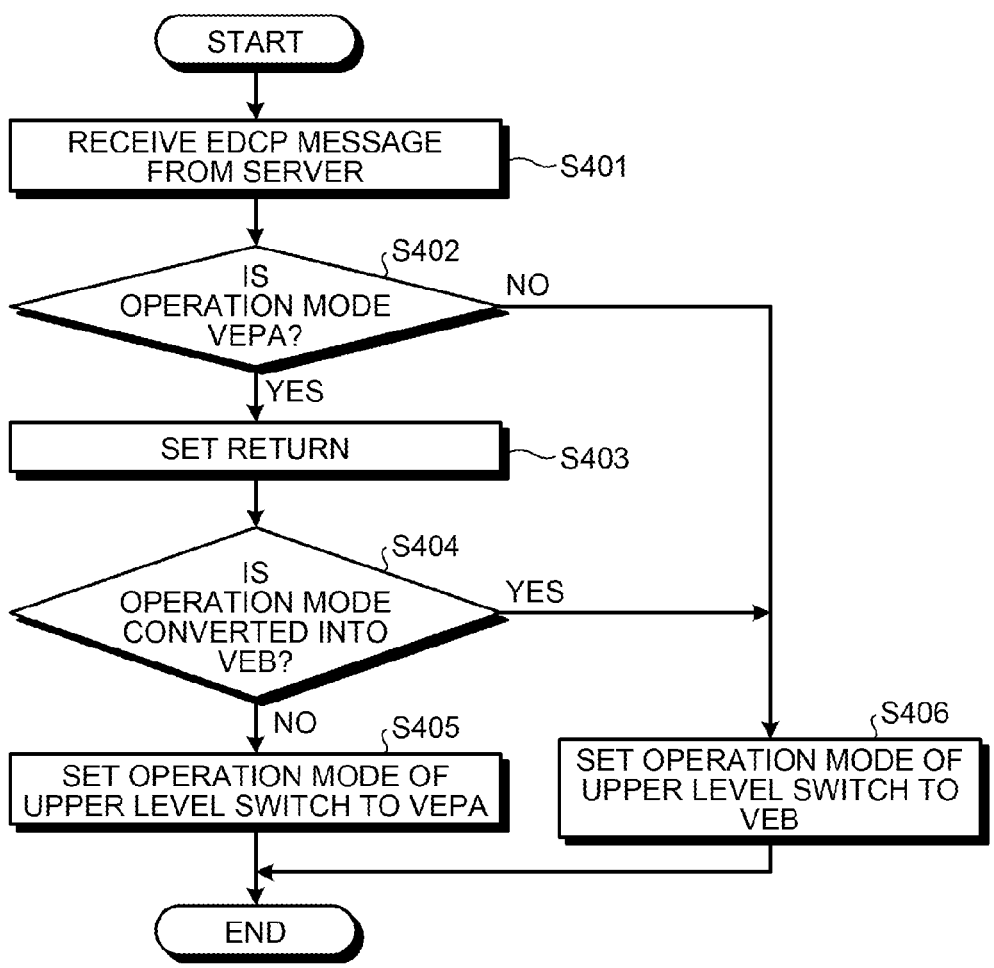
FIG. 13 is a flowchart illustrating the procedure of processing executed by the switch blade according to the second embodiment when receiving an EDCP message.

FIG. 13 is a flowchart illustrating the procedure of processing executed by the switch blade according to the second embodiment when receiving the EDCP message. As illustrated in FIG. 13, when receiving the EDCP message from the CPU server (S401), the EVB processing unit 31 of the switch blade 20 determines whether the operation mode of the CPU server is "VEPA" (S402).

Figure 14:
FIG. 14 is a schematic diagram illustrating an example of an EDCP message used in an EVB discovery protocol.

For example, the EVB processing unit 31 receives the EDCP message defined in an EVB TLV format illustrated in FIG. 14. FIG. 14 is a schematic diagram illustrating an example of the EDCP message used in the EVB discovery protocol. In the message format illustrated in FIG. 14, a TLV Information String in which detailed information of the message is described with 13 octets is added to a TLV header of 16 bits. The EVB processing unit 31 refers to "EVB Capabilities" defined by two octets in the TLV Information String. When "RR (Reflective Relay)" defined by one bit in "EVB Capabilities" is "TRUE", the EVB processing unit 31 determines the operation mode as "VEPA", and when "RR" is "FALSE", the EVB processing unit 31 determines the operation mode as "VEB".

If the EVB processing unit 31 determines that the operation mode of the CPU server is "VEPA" (Yes at S402), the EVB processing unit 31 sets the return in the switch itself (S403). At this time, the EVB processing unit 31 stores the operation mode of the CPU server in the operation mode table 30.

Subsequently, the EVB processing unit 31 refers to the operation mode table 30, and determines whether the EVB processing unit 31 converts the operation mode into "VEB" (S404). If the EVB processing unit 31 determines that the EVB processing unit 31 does not convert the operation mode into "VEB" (No at S404), the EVB processing unit 31 sets the operation mode of the upper level switch to "VEPA" (S405). On the other hand, if the EVB processing unit 31 determines that the EVB processing unit 31 converts the operation mode into "VEB" (Yes at S404), the EVB processing unit 31 sets the operation mode of the upper level switch to "VEB" (S406).

For example, the EVB processing unit 31 refers to the operation mode table 30, and, when the operation mode of the CPU server is "VEPA" and the operation mode of the external switch 60 is "VEPA", determines that the EVB processing unit 31 does not convert the operation mode of the whole of the blade server into "VEB". The EVB processing unit 31 refers to the operation mode table 30, and, when the operation mode of the CPU server is "VEPA" and the operation mode of the external switch 60 is "VEB", determines that the EVB processing unit 31 converts the operation mode of the whole of the blade server into "VEB".

At S402, if the EVB processing unit 31 determines that the operation mode of the CPU server is not "VEPA" (No at S402), the EVB processing unit 31 executes S406 described above.

Procedure of EDCP Message Extension Processing

Figure 15:
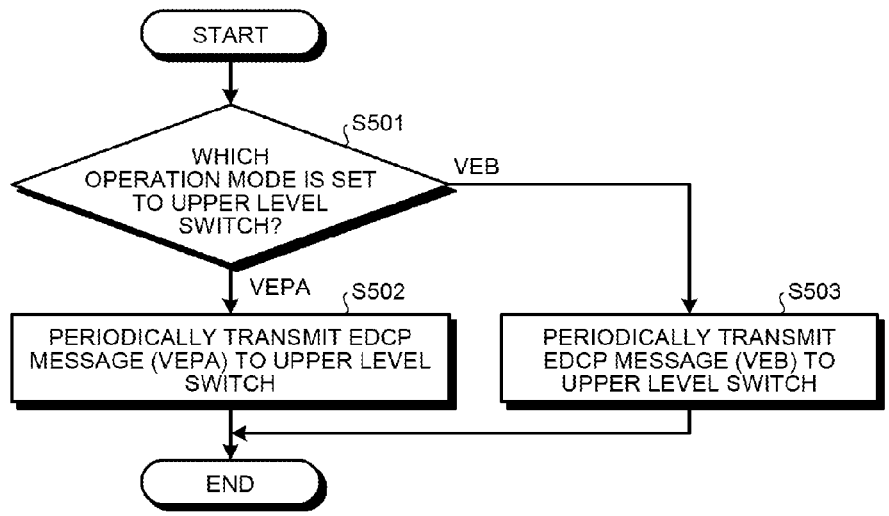
FIG. 15 is a flowchart illustrating the procedure of EDCP message extension processing executed by the switch blade according to the second embodiment.

FIG. 15 is a flowchart illustrating the procedure of EDCP message extension processing executed by the switch blade according to the second embodiment. As illustrated in FIG. 15, when reaching an operation mode notification timing, the EVB processing unit 31 of the switch blade 20 determines the operation mode of the upper level switch (S501). That is, the EVB processing unit 31 determines the operation mode determined as being notified to the upper level switch in the flowchart illustrated in FIG. 13.

Then, if the EVB processing unit 31 determines that the operation mode to be notified is "VEPA", the EVB processing unit 31 transmits, to the external switch 60, the EDCP message in which "RR" in "EVB Capabilities" is set to "TRUE" (S502). On the other hand, if the EVB processing unit 31 determines that the operation mode to be notified is "VEB", the EVB processing unit 31 transmits, to the external switch 60, the EDCP message in which "RR" in "EVB Capabilities" is set to "FALSE" (S503).

Advantageous Effects of the Second Embodiment

According to the second embodiment, the blade server 10 is exchanging the EVB discovery protocol between itself and the external switch 60, whereby the external switch 60 can operate as an adjacent switch. In addition, the switch blade 20 is caused to be recognized as the VEB by the external switch 60. When the blade server 10 is the VEB, the return from the switch blade is caused to be off, and when the blade server 10 is the VEPA, the return from the switch blade is caused to be on.

As a result, by adjusting the operation of the edge virtual switch, the communication in the blade server is returned by the switch blade while the VSI discovery protocol is extended to the external switch 60, thereby providing advantageous effects in the bandwidth and the delay time.

In addition, offloading of the virtual switch generated by software can reduce the load on the CPU and increase the server intensity. Furthermore, the visualization of the communication between the VMs is achievable and the mirroring is executable, resulting in problem investigation being readily performed. In addition, the management of the virtual switches can be unified. This makes it possible to execute the same processing within the blade server or the CPU server, and outside the blade server or the CPU server.

[c] Third Embodiment

While the embodiments of the present invention have been described above, the present invention may be implemented in various forms other than the above-described embodiments. Different embodiments are described below.

Configuration Example

In the first and the second embodiments, the descriptions are made using the blade server as an example.

The present invention, however, is not limited to this application and can be also applied to a rack mount server in the same manner. In the first and the second modifications, the descriptions are made using the two-level structure of the switch blade and the external switch as an example. The present invention, however, is not limited to this application, and can be applied to the structure more than two levels in the same manner. For example, the processing of the first or the second embodiment is executed by a first level switch and a second level switch, and the processing of the first or the second embodiment is executed by a single switch consisting of a combination of the first level switch and the second level switch and a third level switch.

System

The whole or part of the processing described as that automatically performed, out of the pieces of processing described in the present embodiment, can be manually performed. Alternatively, the whole or part of the processing described as that manually performed can be automatically performed in a known manner. In addition, the processing procedures, control procedures, and the specific names, which are indicated in the above description and drawings, and information including various types of data and parameters as illustrated in FIGS. 4 to 7 and 14, for example, can be changed in any desired manner, unless otherwise specified.

Furthermore, the components of the respective devices illustrated in the drawings are functionally conceptual ones, and are not always required to be physically configured as illustrated in the drawings. That is, specific forms of distributions and integrations of the respective devices, such as the integration of the receiving unit 26a and the determination unit 26b, are not limited to those illustrated in the drawings. That is, all or part of them may be structured to be functionally or physically distributed or integrated in any units in accordance with various loads, use conditions, or the like. Furthermore, all or part of the processing functions performed by the respective devices may be implemented by a CPU and a computer program analyzed and executed by the CPU, or may be implemented as hardware by wired logics.

Computer Program

The various types of processing described in the above-described embodiments may be achieved by a computer system, such as a personal computer or a work station, executing a preliminarily prepared program. Thus, an example of the computer system executing a computer program having the same functions as the above-described embodiments is described below.

Figure 16:
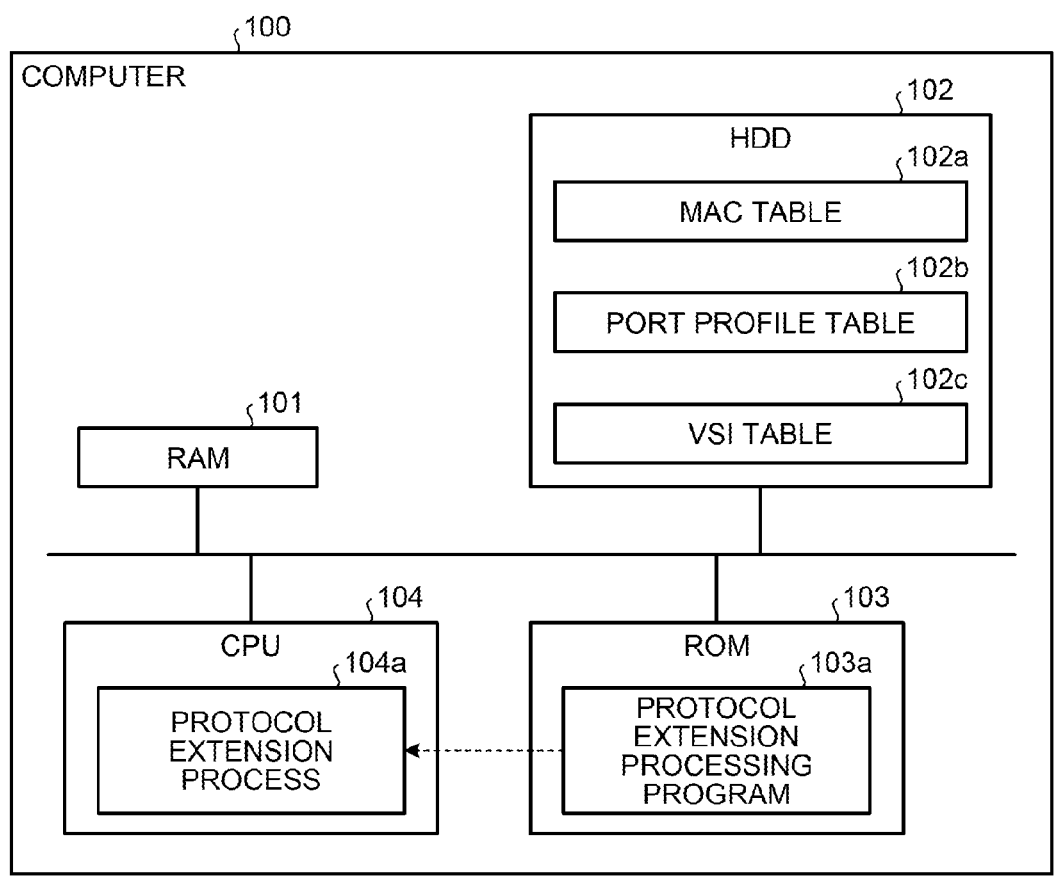
FIG. 16 is a schematic diagram illustrating an example of a computer executing a protocol extension processing program.
Figure 17:
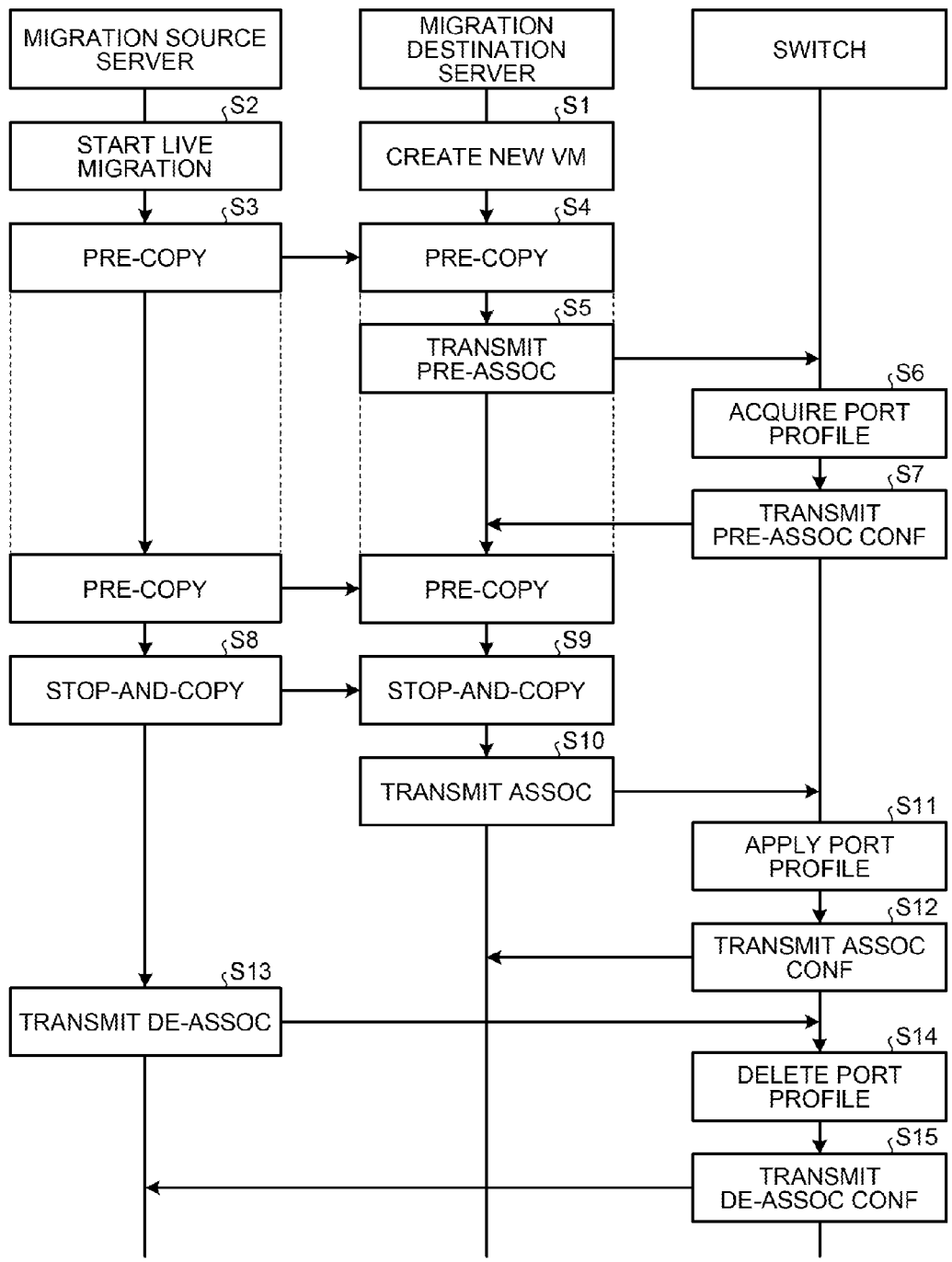
FIG. 17 is a sequence diagram illustrating automated processing of a port profile according to the related art.
Figure 18:
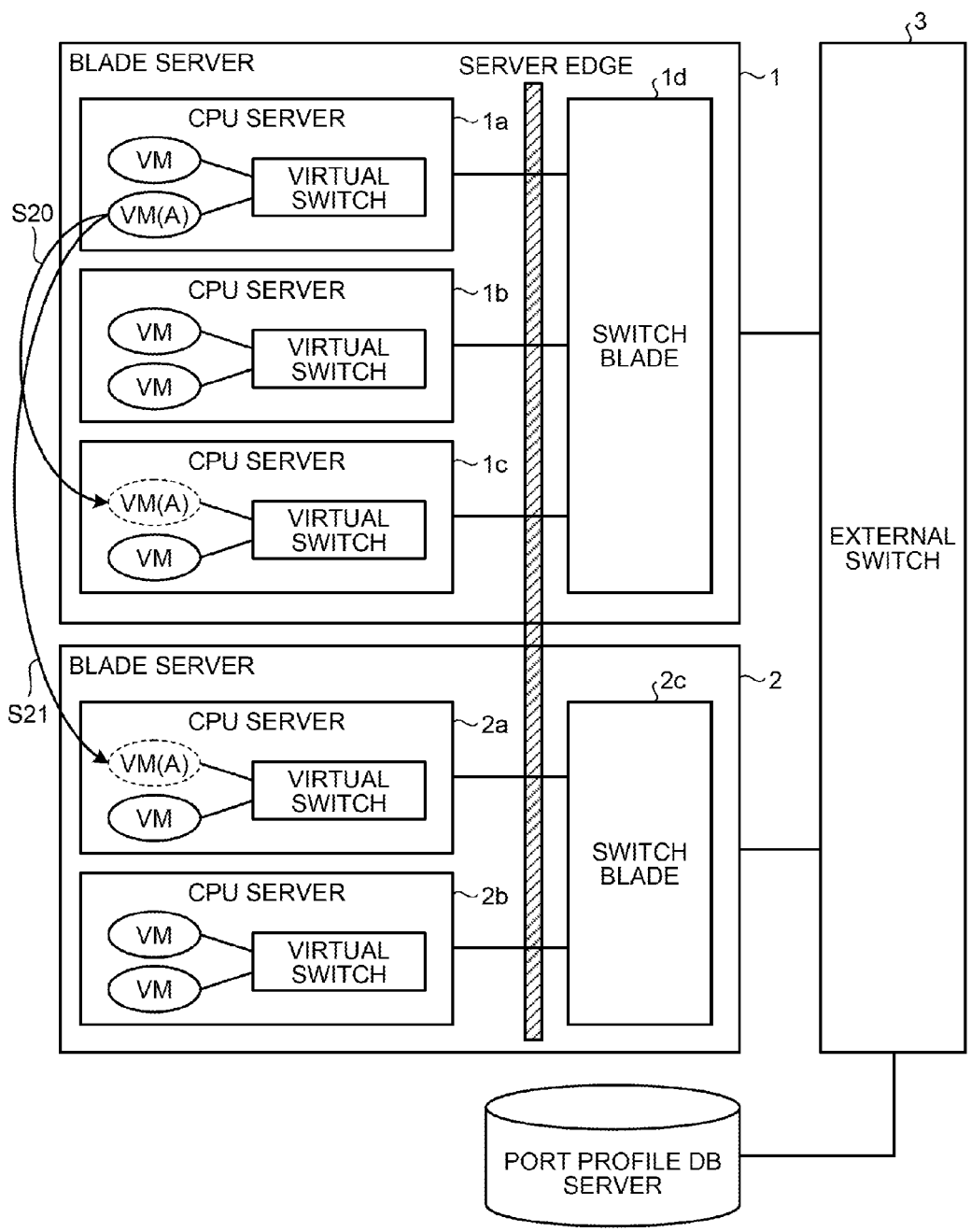
FIG. 18 is a schematic diagram explaining automated processing of a port profile in a blade server according to the related art.

FIG. 16 is a schematic diagram illustrating an example of a computer executing a protocol extension processing program. As illustrated in FIG. 16, a computer 100 includes a RAM 101, an HDD 102, a ROM 103, and a CPU 104. The HDD 102 is provided with a MAC table 102a that stores therein the same information as the MAC table 24 and a port profile table 102b that stores therein the same information as the port profile table 22. The HDD 102 is provided with a VSI table 102c that stores therein the same information as the VSI table 23.

In the ROM 103, a computer program is preliminarily stored that exhibits the same functions as the above-described embodiments. That is, as illustrated in FIG. 16, a protocol extension processing program 103a is preliminarily stored in the ROM 103.

The CPU 104 reads and executes the protocol extension processing program 103a so as to execute a protocol extension process 104a as illustrate in FIG. 16. The protocol extension process 104a performs the same operations as the receiving unit 26a, the determination unit 26b, and the forwarding unit 26d. In addition, the protocol extension process 104a performs the same operation as the EVB processing unit 31.

The protocol extension processing program 103a is not always required to be stored in the ROM 103. For example, it may be stored in a "portable physical medium" inserted in the computer 100, such as a flexible disk (FD), a CD-ROM, a DVD disk, a magneto optical disk, or an IC card. Alternatively, it may be also stored in a "fixed physical medium" such as a hard disk drive (HDD) provided inside or outside the computer 100. Furthermore, it may be stored in "another computer" connected to the computer 100 through a public line, the Internet, LAN, WAN, or the like. Then, the computer 100 may read and execute the program from these.

That is, the program described in the other embodiments is stored in a recording medium, such as the "portable physical medium", the "fixed physical medium", and the "communications medium" so as to be readable by a computer. The computer 100 reads the program from these recording media, executes it, and implements the same functions as the above-described embodiments. The program described in the other embodiments is not limited to what is executed by the computer 100. For example, the present invention can be applied in the same manner to a case where the program is executed by another computer or server, or a case where the program is executed by these in cooperation with each other.

The port profile can be automatically set to the switches configured in a multi-level structure.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a profile processing program for migrating port profile associated with a target virtual machine to be migrated that causes a switch blade that is mounted in a blade server mounting an insertable and removable internal blade and that connects a migration destination blade and an external switch to execute a process comprising:

receiving, from the migration destination blade to which the target virtual machine to be migrated is migrated, a setting request of port profile information corresponding to the target virtual machine;

determining whether, in a storage unit storing therein a target virtual machine identifier identifying the target virtual machine, the target virtual machine identifier included in the received setting request is stored;

executing a setting process of port profile information according to the setting request when it is determined that the received target virtual machine identifier is stored in the storage unit;

forwarding the setting request to the external switch connected to the migration destination blade through the switch blade when it is determined that the received target virtual machine identifier is not stored in the storage unit;

specifying an operation mode of an edge virtual bridge discovery protocol which is set in the internal blade and an operation mode of the edge virtual bridge discovery protocol which is set in the external switch, when the operation mode of the internal blade is a VEB (Virtual Ethernet Bridge), activating a setting of a return from the data relay device and controlling communication between the virtual machines running on the internal blade within the blade server, when the operation mode of the internal blade is a VEPA (Virtual Ethernet Port Aggregator), inactivating the setting of the return from the data relay device and controlling the communication between the virtual machines running on the internal blade through the external switch, notifying the external switch of the operating mode of the internal blade specified when the operating mode of the internal blade and the operating mode of the external switch are the same, and changing the operating mode of the internal blade from the VEPA to the VEB when the operating mode of the internal server is the VEPA and the operating mode of the external switch is the VEB, and notifying the external switch of the VEB as the operating mode of the internal blade.

2. The non-transitory computer-readable recording medium according to claim 1, wherein the process further comprises:

deleting the port profile information stored in the storage unit in association with the target virtual machine identifier included in a deletion request, when the deletion request of the port profile information corresponding to the target virtual machine is received from a migration source blade being mounted in the blade server on which the target virtual machine is running in the case that it is determined that the received target virtual machine identifier is stored in the storage unit.

3. The non-transitory computer-readable recording medium according to claim 1, wherein the determining includes determining, when the received setting request is a PRE-ASSOC message of a VSI (Virtual Station Interface) discovery protocol, whether the target virtual machine identifier included in the PRE-ASSOC message is stored in the storage unit, and forwarding an ASSOC message of the VSI discovery protocol to the external switch without performing the determination of whether the target virtual machine identifier is stored, the ASSOC message being received after it is determined that the target virtual machine identifier included in the PRE-ASSOC message is not stored in the storage unit.

4. A non-transitory computer-readable recording medium having stored therein a profile processing program for migrating port profile associated with a target virtual machine to be migrated that causes a switch blade that is mounted in a blade server mounting an insertable and removable internal blade and that connects a migration source server blade and an external switch to execute a process comprising:

receiving, from the migration source blade on which the target virtual machine to be migrated is running, a deletion request of port profile information corresponding to the target virtual machine;

determining whether, in a storage unit storing therein a target virtual machine identifier identifying the target virtual machine, the target virtual machine identifier included in the received deletion request is stored;

deleting port profile information stored in the storage unit in association with the migrated virtual machine identifier when it is determined that the received target virtual machine identifier is stored in the storage unit; and forwarding the deletion request to the external switch connected to the migration source blade through the switch or destroying the deletion request when it is determined that the received target virtual machine identifier is not stored in the storage unit;

specifying an operation mode of an edge virtual bridge discovery protocol which is set in the internal blade and an operation mode of the edge virtual bridge discovery protocol which is set in the external switch, when the operation mode of the internal blade is a VEB (Virtual Ethernet Bridge), activating a setting of a return from the switch blade and controlling communication between the virtual machines running on the internal blade within the blade server, when the operation mode of the internal blade is a VEPA (Virtual Ethernet Port Aggregator), inactivating the setting of the return from the switch blade and controlling the communication between the virtual machines running on the internal blade through the external switch, notifying the external switch of the operating mode of the internal blade specified when the operating mode of the internal blade and the operating mode of the external switch are the same, and changing the operating mode of the internal blade from the VEPA to the VEB when the operating mode of the internal server is the VEPA and the operating mode of the external switch is the VEB, and notifying the external switch of the VEB as the operating mode of the internal blade.

5. A data relay device that is mounted in a blade server mounting an insertable and removable internal blade and that connects a migration destination blade and an external switch comprising:

a memory that stores therein a virtual machine identifier identifying a target virtual machine running on a server the internal blade connected to the data relay device; and a processor coupled to the memory, wherein the processor executes a process for migrating port profile associated with the target virtual machine to be migrated including:

receiving, from the migration destination blade to which the target virtual machine to be migrated is migrated, a setting request of port profile information corresponding to the target virtual machine;

determining whether the target virtual machine identifier included in the setting request received at the receiving is stored in the memory;

executing a setting process of port profile information according to the setting request when the received target virtual machine identifier is stored in the memory; and forwarding the setting request to the external switch connected to the migration destination blade through the data relay device when the received target virtual machine identifier is not stored in the memory;

specifying an operation mode of an edge virtual bridge discovery protocol which is set in the internal blade and an operation mode of the edge virtual bridge discovery protocol which is set in the external switch, when the operation mode of the internal blade is a VEB (Virtual Ethernet Bridge), activating a setting of a return from the data relay device and controlling communication between the virtual machines running on the internal blade within the blade server, when the operation mode of the internal blade is a VEPA (Virtual Ethernet Port Aggregator), inactivating the setting of the return from the data relay device and controlling the communication between the virtual machines running on the internal blade through the external switch, notifying the external switch of the operating mode of the internal blade specified when the operating mode of the internal blade and the operating mode of the external switch are the same, and changing the operating mode of the internal blade from the VEPA to the VEB when the operating mode of the internal server is the VEPA and the operating mode of the external switch is the VEB, and notifying the external switch of the VEB as the operating mode of the internal blade.

* * * * *